United States Patent
Bellegarda et al.

(10) Patent No.: US 11,829,720 B2
(45) Date of Patent: Nov. 28, 2023

(54) ANALYSIS AND VALIDATION OF LANGUAGE MODELS

(71) Applicant: Apple Inc., Cupertino, CA (US)

(72) Inventors: Jerome R. Bellegarda, Saratoga, CA (US); Bishal Barman, Cupertino, CA (US); Brent D. Ramerth, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 17/108,933

(22) Filed: Dec. 1, 2020

(65) Prior Publication Data

US 2022/0067283 A1 Mar. 3, 2022

Related U.S. Application Data

(60) Provisional application No. 63/073,264, filed on Sep. 1, 2020.

(51) Int. Cl.
  *G06F 40/284* (2020.01)
  *G06N 20/00* (2019.01)
  *G06F 40/40* (2020.01)

(52) U.S. Cl.
  CPC .......... *G06F 40/284* (2020.01); *G06F 40/40* (2020.01); *G06N 20/00* (2019.01)

(58) Field of Classification Search
  CPC ........ G06F 40/284; G06F 40/40; G06N 20/00
  See application file for complete search history.

(56) References Cited

U.S. PATENT DOCUMENTS

| | | | |
|---|---|---|---|
| 7,475,010 B2 | 1/2009 | Chao | |
| 7,475,015 B2 | 1/2009 | Epstein et al. | |
| 7,502,738 B2 | 3/2009 | Kennewick et al. | |
| 7,555,431 B2 | 6/2009 | Bennett | |

(Continued)

FOREIGN PATENT DOCUMENTS

| | | |
|---|---|---|
| AU | 2015203483 A1 | 7/2015 |
| WO | 2015/153310 A1 | 10/2015 |

OTHER PUBLICATIONS

Bellegarda Jeromer, "Chapter 1: Spoken Language Understanding for Natural Interaction: The Siri Experience", Natural Interaction with Robots, Knowbots and Smartphones, 2014, pp. 3-14.

(Continued)

*Primary Examiner* — Michael N Opsasnick
(74) *Attorney, Agent, or Firm* — DLA Piper LLP (US)

(57) ABSTRACT

Systems and methods for analysis and validation of language models trained using data that is unavailable or inaccessible are provided. One example method includes, at an electronic device with one or more processors and memory, obtaining a first set of data corresponding to one or more tokens predicted based on one or more previous tokens. The method determines a probability that the first set of data corresponds to a prediction generated by a first language model trained using a user privacy preserving training process. In accordance with a determination that the probability is within a predetermined range, the method determines that the one or more tokens correspond to a prediction associated with the user privacy preserving training process and outputs a predicted token sequence including the one or more tokens and the one or more previous tokens.

45 Claims, 11 Drawing Sheets

(56) References Cited

U.S. PATENT DOCUMENTS

| | | |
|---|---|---|
| 7,596,269 B2 | 9/2009 | King et al. |
| 7,620,549 B2 | 11/2009 | Di Cristo et al. |
| 7,624,007 B2 | 11/2009 | Bennett |
| 7,634,409 B2 | 12/2009 | Kennewick et al. |
| 7,640,160 B2 | 12/2009 | Di Cristo et al. |
| 7,647,225 B2 | 1/2010 | Bennett et al. |
| 7,657,424 B2 | 2/2010 | Bennett |
| 7,689,412 B2 | 3/2010 | Wu et al. |
| 7,693,720 B2 | 4/2010 | Kennewick et al. |
| 7,698,131 B2 | 4/2010 | Bennett |
| 7,702,508 B2 | 4/2010 | Bennett |
| 7,707,027 B2 | 4/2010 | Balchandran et al. |
| 7,716,056 B2 | 5/2010 | Weng et al. |
| 7,725,307 B2 | 5/2010 | Bennett |
| 7,725,318 B2 | 5/2010 | Gavalda et al. |
| 7,725,320 B2 | 5/2010 | Bennett |
| 7,725,321 B2 | 5/2010 | Bennett |
| 7,729,904 B2 | 6/2010 | Bennett |
| 7,742,953 B2 | 6/2010 | King et al. |
| 7,752,152 B2 | 7/2010 | Paek et al. |
| 7,756,708 B2 | 7/2010 | Cohen et al. |
| 7,809,570 B2 | 10/2010 | Kennewick et al. |
| 7,818,176 B2 | 10/2010 | Freeman et al. |
| 7,831,426 B2 | 11/2010 | Bennett |
| 7,853,444 B2 | 12/2010 | Wang et al. |
| 7,870,118 B2 | 1/2011 | Jiang et al. |
| 7,873,519 B2 | 1/2011 | Bennett |
| 7,895,531 B2 | 2/2011 | Radtke et al. |
| 7,917,367 B2 | 3/2011 | Di Cristo et al. |
| 7,930,168 B2 | 4/2011 | Weng et al. |
| 7,949,529 B2 | 5/2011 | Weider et al. |
| 7,983,917 B2 | 7/2011 | Kennewick et al. |
| 8,015,006 B2 | 9/2011 | Kennewick et al. |
| 8,069,046 B2 | 11/2011 | Kennewick et al. |
| 8,073,681 B2 | 12/2011 | Baldwin et al. |
| 8,112,275 B2 | 2/2012 | Kennewick et al. |
| 8,140,335 B2 | 3/2012 | Kennewick et al. |
| 8,145,489 B2 | 3/2012 | Freeman et al. |
| 8,195,468 B2 | 6/2012 | Weider et al. |
| 8,326,627 B2 | 12/2012 | Kennewick et al. |
| 8,332,224 B2 | 12/2012 | Di Cristo et al. |
| 8,374,871 B2 | 2/2013 | Ehsani et al. |
| 8,515,736 B1 | 8/2013 | Duta |
| 8,543,398 B1 | 9/2013 | Strope et al. |
| 8,583,416 B2 | 11/2013 | Huang et al. |
| 8,589,161 B2 | 11/2013 | Kennewick et al. |
| 8,600,746 B1 | 12/2013 | Lei et al. |
| 8,620,659 B2 | 12/2013 | Di Cristo et al. |
| 8,626,681 B1 | 1/2014 | Jurca et al. |
| 8,638,363 B2 | 1/2014 | King et al. |
| 8,713,418 B2 | 4/2014 | King et al. |
| 8,762,156 B2 | 6/2014 | Chen |
| 8,798,255 B2 | 8/2014 | Lubowich et al. |
| 8,903,716 B2 | 12/2014 | Chen et al. |
| 8,938,450 B2 | 1/2015 | Spivack et al. |
| 8,942,986 B2 | 1/2015 | Cheyer et al. |
| 8,990,235 B2 | 3/2015 | King et al. |
| 9,009,046 B1 | 4/2015 | Stewart |
| 9,026,425 B2 | 5/2015 | Nikoulina et al. |
| 9,037,967 B1 | 5/2015 | Al-jefri et al. |
| 9,076,448 B2 | 7/2015 | Bennett et al. |
| 9,164,983 B2 | 10/2015 | Liu et al. |
| 9,171,541 B2 | 10/2015 | Kennewick et al. |
| 9,262,612 B2 | 2/2016 | Cheyer |
| 9,280,535 B2 | 3/2016 | Varma et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,305,548 B2 | 4/2016 | Kennewick et al. |
| 9,330,659 B2 | 5/2016 | Ju et al. |
| 9,367,541 B1 | 6/2016 | Servan et al. |
| 9,436,918 B2 | 9/2016 | Pantel et al. |
| 9,437,189 B2 | 9/2016 | Epstein et al. |
| 9,465,833 B2 | 10/2016 | Aravamudan et al. |
| 9,465,864 B2 | 10/2016 | Hu et al. |
| 9,495,129 B2 | 11/2016 | Fleizach et al. |
| 9,502,025 B2 | 11/2016 | Kennewick et al. |
| 9,535,906 B2 | 1/2017 | Lee et al. |
| 9,620,113 B2 | 4/2017 | Kennewick et al. |
| 9,626,955 B2 | 4/2017 | Fleizach et al. |
| 9,633,004 B2 | 4/2017 | Giuli et al. |
| 9,633,660 B2 | 4/2017 | Haughay |
| 9,652,453 B2 | 5/2017 | Mathur et al. |
| 9,668,121 B2 | 5/2017 | Naik et al. |
| 9,697,822 B1 | 7/2017 | Naik et al. |
| 9,697,827 B1 | 7/2017 | Lilly et al. |
| 9,721,566 B2 | 8/2017 | Newendorp et al. |
| 9,818,400 B2 | 11/2017 | Paulik et al. |
| 9,823,811 B2 | 11/2017 | Brown et al. |
| 9,830,044 B2 | 11/2017 | Brown et al. |
| 9,886,953 B2 | 2/2018 | Lemay et al. |
| 9,934,777 B1 | 4/2018 | Joseph et al. |
| 9,966,065 B2 | 5/2018 | Gruber et al. |
| 9,966,068 B2 | 5/2018 | Cash et al. |
| 9,972,304 B2 * | 5/2018 | Paulik ..................... G10L 15/01 |
| 9,986,419 B2 | 5/2018 | Naik et al. |
| 10,013,416 B1 | 7/2018 | Bhardwaj et al. |
| 10,049,663 B2 | 8/2018 | Orr et al. |
| 10,049,668 B2 | 8/2018 | Huang et al. |
| 10,074,360 B2 | 9/2018 | Kim |
| 10,083,690 B2 | 9/2018 | Giuli et al. |
| 10,088,972 B2 | 10/2018 | Brown et al. |
| 10,089,072 B2 | 10/2018 | Piersol et al. |
| 10,102,359 B2 | 10/2018 | Cheyer |
| 10,127,901 B2 | 11/2018 | Zhao et al. |
| 10,169,329 B2 | 1/2019 | Futrell et al. |
| 10,170,123 B2 | 1/2019 | Orr et al. |
| 10,176,167 B2 | 1/2019 | Evermann |
| 10,186,254 B2 | 1/2019 | Williams et al. |
| 10,223,066 B2 | 3/2019 | Martel et al. |
| 10,296,160 B2 | 5/2019 | Shah et al. |
| 10,297,253 B2 | 5/2019 | Walker, II et al. |
| 10,356,243 B2 | 7/2019 | Sanghavi et al. |
| 10,403,283 B1 | 9/2019 | Schramm et al. |
| 10,496,705 B1 | 12/2019 | Irani et al. |
| 10,497,366 B2 * | 12/2019 | Sapugay ................. G06N 20/00 |
| 10,504,518 B1 | 12/2019 | Irani et al. |
| 10,559,225 B1 * | 2/2020 | Tao ......................... G09B 19/04 |
| 10,568,032 B2 | 2/2020 | Freeman et al. |
| 2008/0228482 A1 * | 9/2008 | Abe ..................... G10L 15/1815 |
| | | 704/E15.001 |
| 2009/0006343 A1 | 1/2009 | Platt et al. |
| 2009/0024392 A1 * | 1/2009 | Koshinaka .............. G10L 15/18 |
| | | 704/E15.044 |
| 2009/0030800 A1 | 1/2009 | Grois |
| 2009/0055168 A1 | 2/2009 | Wu et al. |
| 2009/0055381 A1 | 2/2009 | Wu et al. |
| 2009/0060351 A1 | 3/2009 | Li et al. |
| 2009/0089058 A1 | 4/2009 | Bellegarda |
| 2009/0157382 A1 | 6/2009 | Bar |
| 2009/0157513 A1 | 6/2009 | Bonev et al. |
| 2009/0248422 A1 | 10/2009 | Li et al. |
| 2009/0281789 A1 | 11/2009 | Waibel et al. |
| 2009/0326923 A1 | 12/2009 | Yan et al. |
| 2010/0023331 A1 | 1/2010 | Duta et al. |
| 2010/0036660 A1 | 2/2010 | Bennett |
| 2010/0145694 A1 | 6/2010 | Ju et al. |
| 2011/0144973 A1 | 6/2011 | Bocchieri et al. |
| 2011/0196670 A1 | 8/2011 | Dang et al. |
| 2011/0288852 A1 | 11/2011 | Dymetman et al. |
| 2012/0158399 A1 | 6/2012 | Tremblay et al. |
| 2012/0296638 A1 | 11/2012 | Patwa |
| 2013/0173258 A1 | 7/2013 | Liu et al. |
| 2013/0185336 A1 | 7/2013 | Singh et al. |
| 2013/0226935 A1 | 8/2013 | Bai et al. |
| 2013/0325436 A1 | 12/2013 | Wang et al. |
| 2014/0059030 A1 | 2/2014 | Hakkani-tur et al. |
| 2014/0067361 A1 | 3/2014 | Nikoulina et al. |
| 2014/0163962 A1 | 6/2014 | Castelli et al. |
| 2014/0244248 A1 | 8/2014 | Arisoy et al. |
| 2014/0244254 A1 | 8/2014 | Ju et al. |
| 2015/0006148 A1 | 1/2015 | Goldszmit et al. |
| 2015/0073788 A1 | 3/2015 | Sak et al. |
| 2015/0120296 A1 | 4/2015 | Stern et al. |

(56) References Cited

U.S. PATENT DOCUMENTS

| | | | |
|---|---|---|---|
| 2015/0154185 | A1 | 6/2015 | Waibel |
| 2015/0161521 | A1 | 6/2015 | Shah et al. |
| 2015/0186155 | A1 | 7/2015 | Brown et al. |
| 2015/0186156 | A1 | 7/2015 | Brown et al. |
| 2015/0278370 | A1 | 10/2015 | Stratvert et al. |
| 2015/0279360 | A1 | 10/2015 | Mengibar et al. |
| 2015/0314454 | A1 | 11/2015 | Breazeal et al. |
| 2015/0347382 | A1* | 12/2015 | Dolfing ................ G06F 40/274 704/9 |
| 2015/0379414 | A1 | 12/2015 | Yeh et al. |
| 2016/0078860 | A1 | 3/2016 | Paulik et al. |
| 2016/0086599 | A1 | 3/2016 | Kurata et al. |
| 2016/0092434 | A1* | 3/2016 | Bellegarda ............. G06F 40/35 704/9 |
| 2016/0162456 | A1 | 6/2016 | Munro et al. |
| 2016/0210551 | A1 | 7/2016 | Lee et al. |
| 2016/0267904 | A1 | 9/2016 | Biadsy et al. |
| 2016/0299685 | A1 | 10/2016 | Zhai et al. |
| 2016/0337301 | A1 | 11/2016 | Rollins et al. |
| 2017/0026318 | A1 | 1/2017 | Daniel et al. |
| 2017/0053652 | A1 | 2/2017 | Choi et al. |
| 2017/0068550 | A1 | 3/2017 | Zeitlin |
| 2017/0154033 | A1 | 6/2017 | Lee |
| 2017/0221486 | A1 | 8/2017 | Kurata et al. |
| 2017/0263248 | A1 | 9/2017 | Gruber et al. |
| 2017/0270912 | A1 | 9/2017 | Levit et al. |
| 2017/0286397 | A1 | 10/2017 | Gonzalez |
| 2018/0137857 | A1 | 5/2018 | Zhou et al. |
| 2018/0143967 | A1 | 5/2018 | Anbazhagan et al. |
| 2018/0150744 | A1 | 5/2018 | Orr et al. |
| 2018/0182376 | A1* | 6/2018 | Van Gysel ............. G10L 21/10 |
| 2018/0330722 | A1 | 11/2018 | Newendorp et al. |
| 2018/0365091 | A1* | 12/2018 | Donaldson ............... G06N 3/08 |
| 2019/0034040 | A1 | 1/2019 | Shah et al. |
| 2019/0272318 | A1* | 9/2019 | Suzuki ................ G06N 3/0445 |
| 2019/0349333 | A1* | 11/2019 | Pickover ................. G06N 3/02 |
| 2019/0355346 | A1 | 11/2019 | Bellegarda |
| 2020/0137230 | A1 | 4/2020 | Spohrer |
| 2020/0243094 | A1* | 7/2020 | Thomson .................. G10L 5/32 |
| 2020/0286472 | A1 | 9/2020 | Newendorp et al. |
| 2020/0380963 | A1 | 12/2020 | Chappidi et al. |
| 2021/0143987 | A1* | 5/2021 | Xu ......................... G06N 20/00 |
| 2021/0327410 | A1* | 10/2021 | Beaufays ................ G10L 15/22 |

OTHER PUBLICATIONS

Berry et al., "PTIME: Personalized Assistance for Calendaring", ACM Transactions on Intelligent Systems and Technology, vol. 2, No. 4, Article 40, Jul. 2011, pp. 1-22.

Bocchieri et al., "Use of Geographical Meta-Data in ASR Language and Acoustic Models", IEEE International Conference on Acoustics Speech and Signal Processing, 2010, pp. 5118-5121.

Cambria et al., "Jumping NLP curves: A Review of Natural Language Processing Research.", IEEE Computational Intelligence magazine, 2014, vol. 9, May 2014, pp. 48-57.

Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.

Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.

Conneau et al., "Supervised Learning of Universal Sentence Representations from Natural Language Inference Data", Proceedings of the 2017 Conference on Empirical Methods in Natural Language Processing, Sep. 7-11, 2017, pp. 670-680.

Czech Lucas, "A System for Recognizing Natural Spelling of English Words", Diploma Thesis, Karlsruhe Institute of Technology, May 7, 2014, 107 pages.

Eder et al., "At the Lower End of Language—Exploring the Vulgar and Obscene Side of German", Proceedings of the Third Workshop on Abusive Language Online, Florence, Italy, Aug. 1, 2019, pp. 119-128.

Gupta et al., "I-vector-based Speaker Adaptation of Deep Neural Networks for French Broadcast Audio Transcription", ICASSP, 2014, 2014, pp. 6334-6338.

Isik et al., "Single-Channel Multi-Speaker Separation using Deep Clustering", Interspeech 2016, Sep. 8-12, 2016, pp. 545-549.

Jawaid et al., "Machine Translation with Significant Word Reordering and Rich Target-Side Morphology", WDS'11 Proceedings of Contributed Papers, Part 1, 2011, pp. 161-166.

Jiang et al., "A Syllable-based Name Transliteration System", Proceedings of the 2009 Named Entities Workshop, Aug. 7, 2009, pp. 96-99.

Jouvet et al., "Evaluating Grapheme-to-phoneme Converters in Automatic Speech Recognition Context", IEEE, 2012, pp. 4821-4824.

Karn, Ujjwal, "An Intuitive Explanation of Convolutional Neural Networks", The Data Science Blog, Aug. 11, 2016, 23 pages.

Lee, Sungjin, "Structured Discriminative Model for Dialog State Tracking", Proceedings of the SIGDIAL 2013 Conference, Aug. 22-24, 2013, pp. 442-451.

Luo et al., "Speaker-Independent Speech Separation with Deep Attractor Network", IEEE/ACM Transactions on Audio, Speech, and Language Processing, vol. 26, No. 4, Apr. 2018, pp. 787-796.

Mikolov et al., "Linguistic Regularities in Continuous Space Word Representations", Proceedings of NAACL-HLT, Jun. 9-14, 2013, pp. 746-751.

Navigli Roberto, "Word Sense Disambiguation: A Survey", ACM Computing Surveys, vol. 41, No. 2, Article 10, Feb. 2009, 69 pages.

Pathak et al., "Privacy-preserving Speech Processing: Cryptographic and String-matching Frameworks Show Promise", In: IEEE signal processing magazine, Feb. 13, 2013, 16 pages.

Patra et al., "A Kernel-Based Approach for Biomedical Named Entity Recognition", Scientific World Journal, vol. 2013, 2013, pp. 1-7.

Pennington et al., "GloVe: Global Vectors for Word Representation", Proceedings of the Conference on Empirical Methods Natural Language Processing (EMNLP), Oct. 25-29, 2014, pp. 1532-1543.

Phoenix Solutions, Inc., "Declaration of Christopher Schmandt Regarding the MIT Galaxy System", West Interactive Corp., a Delaware Corporation, Document 40, Jul. 2, 2010, 162 pages.

Qian et al., "Single-channel Multi-talker Speech Recognition With Permutation Invariant Training", Speech Communication, Issue 104, 2018, pp. 1-11.

Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.

Senior et al., "Improving DNN Speaker Independence With I-Vector Inputs", ICASSP, 2014, pp. 225-229.

Settle et al., "End-to-End Multi-Speaker Speech Recognition", Proc. ICASSP, Apr. 2018, 6 pages.

Shen et al., "Style Transfer from Non-Parallel Text by Cross-Alignment", 31st Conference on Neural Information Processing Systems (NIPS 2017), 2017, 12 pages.

Stent et al., "Geo-Centric Language Models for Local Business Voice Search", AT&T Labs—Research, 2009, pp. 389-396.

Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.

Sundermeyer et al., "LSTM Neural Networks for Language Modeling", Interspeech 2012, ISCA's 13 Annual Conference, Sep. 9-13, 2012, pp. 194-197.

Tan et al., "Knowledge Transfer in Permutation Invariant Training for Single-channel Multi-talker Speech Recognition", ICASSP 2018, 2018, pp. 5714-5718.

Tur et al., "The CALO Meeting Assistant System", IEEE Transactions on Audio, Speech, and Language Processing, vol. 18, No. 6, Aug. 2010, pp. 1601-1611.

(56) References Cited

OTHER PUBLICATIONS

Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.

Wikipedia, "Acoustic Model", Online Available at:—<http://en.wikipedia.org/wiki/AcousticModel>, retrieved on Sep. 14, 2011, pp. 1-2.

Wikipedia, "Language Model", Online Available at:—<http://en.wikipedia.org/wiki/Language_model>, retrieved on Sep. 14, 2011, 4 pages.

Wikipedia, "Siri", Online Available at:—<https://en.wikipedia.org/w/index.php?title=Siri&oldid=689697795>, Nov. 8, 2015, 13 pages.

Wikipedia, "Speech Recognition", Online Available at:—<http://en.wikipedia.org/wiki/Speech_recognition>, retrieved on Sep. 14, 2011, 12 pages.

Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.

Xu et al., "Speech-Based Interactive Games for Language Learning: Reading, Translation, and Question-Answering", Computational Linguistics and Chinese Language Processing, vol. 14, No. 2, Jun. 2009, pp. 133-160.

Yan et al., "A scalable approach to using DNN-derived features in GMM-HMM based acoustic modeling for LVCSR", 14th Annual Conference of the International Speech Communication Association, InterSpeech 2013, Aug. 2013, pp. 104-108.

Yeh Jui-Feng, "Speech Act Identification Using Semantic Dependency Graphs with Probabilistic Context-free Grammars", ACM Transactions on Asian and Low-Resource Language Information Processing, vol. 15, No. 1, Dec. 2015, pp. 5.1-5.28.

Young et al., "The Hidden Information State model: A Practical Framework for POMDP-Based Spoken Dialogue Management", Computer Speech & Language, vol. 24, Issue 2, Apr. 2010., pp. 150-174.

Yu et al., "Recognizing Multi-talker Speech with Permutation Invariant Training", Interspeech 2017, Aug. 20-24, 2017, pp. 2456-2460.

Zhang et al., "Research of Text Classification Model Based on Latent Semantic Analysis and Improved HS-SVM", Intelligent Systems and Applications (ISA), 2010 2nd International Workshop, May 22-23, 2010, 5 pages.

Apple Differential Privacy Team, "Learning with Privacy at Scale", Apple Machine Learning Blog, vol. 1, No. 8, Online available at: https://machinelearning.apple.com/2017/12/06/learning-with-privacy-at-scale.html, Dec. 2017, 9 pages.

Dai et al., "Transformer-XL: Attentive Language Models Beyond a Fixed-Length Context", Online available at: arXiv:1901.02860v3, Jun. 2, 2019, 20 pages.

Dwork et al., "The Algorithmic Foundations of Differential Privacy", Foundations and Trends in Theoretical Computer Science: vol. 9: No. 3-4, 211-407, 2014, 281 pages.

Gu et al., "BadNets: Evaluating Backdooring Attacks on Deep Neural Networks", IEEE Access, vol. 7, Mar. 21, 2019, pp. 47230-47244.

\* cited by examiner

ANALYSIS AND VALIDATION OF LANGUAGE MODELS

CROSS-REFERENCE TO RELATED APPLICATIONS

This application claims priority to U.S. Provisional Patent Application No. 63/073,264, entitled "ANALYSIS AND VALIDATION OF LANGUAGE MODELS," filed Sep. 1, 2020, the contents of which is hereby incorporated by reference in its entirety.

FIELD

The present disclosure relates to techniques for analysis and validation of language models trained using data that is unavailable or inaccessible to the system configured to analyze and validate the language model.

BACKGROUND

Text prediction can be implemented using a language model trained using a static training corpus including many text samples. However, regardless of the size of the static training corpus, it may be challenging to timely encompass the idiosyncrasies of a given language (e.g., newly coined terms or phrases, more frequently used phrases, and the like) that naturally emerge as the language evolves. Actual user data (e.g., real-time user inputted text) can be used to complement the static training corpus to produce more relevant up-to-date text predictions, but may also introduce undesirable deviations into the language model. For example, it would be desirable for a language model to update to promote prediction of the expression "shelter in place" (if the usage frequency of the expression is increasing), but not for a language model to incorporate a gender bias, such as always predicting masculine pronouns in association with the occupation "doctor." However, to comply with data privacy regulations, ethics, and user desire for privacy, the user data used to train the language model may be inaccessible to the administrators/observers of the language model. This inaccessibility may complicate techniques for analyzing and validating the language model, e.g., determining whether the language model generates accurate and desired predictions.

BRIEF SUMMARY

Example processes are disclosed herein. An example process for validating language models includes, at an electronic device with one or more processors and memory: obtaining a first set of data corresponding to one or more tokens predicted based on one or more previous tokens; determining a probability that the first set of data corresponds to a prediction generated by a first language model trained using a user privacy preserving training process; and, in accordance with a determination that the probability is within a predetermined range, determining that the one or more tokens correspond to a prediction associated with the user privacy preserving training process; and outputting a predicted token sequence including the one or more tokens and the one or more previous tokens.

Example electronic devices are disclosed herein. An example electronic device includes one or more processors; a memory; and one or more programs, wherein the one or more programs are stored in the memory and configured to be executed by the one or more processors, the one or more programs including instructions for: obtaining a first set of data corresponding to one or more tokens predicted based on one or more previous tokens; determining a probability that the first set of data corresponds to a prediction generated by a first language model trained using a user privacy preserving training process; and, in accordance with a determination that the probability is within a predetermined range: determining that the one or more tokens correspond to a prediction associated with the user privacy preserving training process; and outputting a predicted token sequence including the one or more tokens and the one or more previous tokens.

Example non-transitory computer-readable storage media are disclosed herein. An example non-transitory computer readable storage medium storing one or more programs, the one or more programs comprising instructions, which when executed by one or more professors of an electronic device, cause the first electronic device to: obtain a first set of data corresponding to one or more tokens predicted based on one or more previous tokens; determine a probability that the first set of data corresponds to a prediction generated by a first language model trained using a user privacy preserving training process; and, in accordance with a determination that the probability is within a predetermined range: determine that the one or more tokens correspond to a prediction associated with the user privacy preserving training process; and output a predicted token sequence including the one or more tokens and the one or more previous tokens.

Example transitory computer-readable storage media are disclosed herein. An example transitory computer readable storage medium storing one or more programs, the one or more programs comprising instructions, which when executed by one or more professors of an electronic device, cause the first electronic device to: obtain a first set of data corresponding to one or more tokens predicted based on one or more previous tokens; determine a probability that the first set of data corresponds to a prediction generated by a first language model trained using a user privacy preserving training process; and, in accordance with a determination that the probability is within a predetermined range: determine that the one or more tokens correspond to a prediction associated with the user privacy preserving training process; and output a predicted token sequence including the one or more tokens and the one or more previous tokens.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Determining that one or more tokens correspond to a prediction associated with a user privacy preserving training process and outputting the predicted token sequence may improve analysis and validation of language models, as the selectively output token sequence allows targeted analysis of language model behavior. That is, because the user privacy preserving training process may be unsupervised (and the user data used to train a language model may not be accessible) and because the language model may be of a massive scale, selectively outputting predictions attributable to the user privacy preserving training process allows evaluations of whether the predictions learned through said process are desirable. If the predictions are not desirable—for instance, if the user data has introduced obscenities or biases into the language model—this selective output and analysis allows modification of the language model to prevent those predictions when the language model is deployed to user devices. In this this manner, the user-device interface is made more efficient, as the use of user data to train a language model allows the language model to be updated to reflect the evolution of language, without sacrificing either user privacy (e.g., through use of the user privacy preserving training process) or effectiveness of the language model (e.g., as undesirable predictions are prevented).

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

Figure 6:
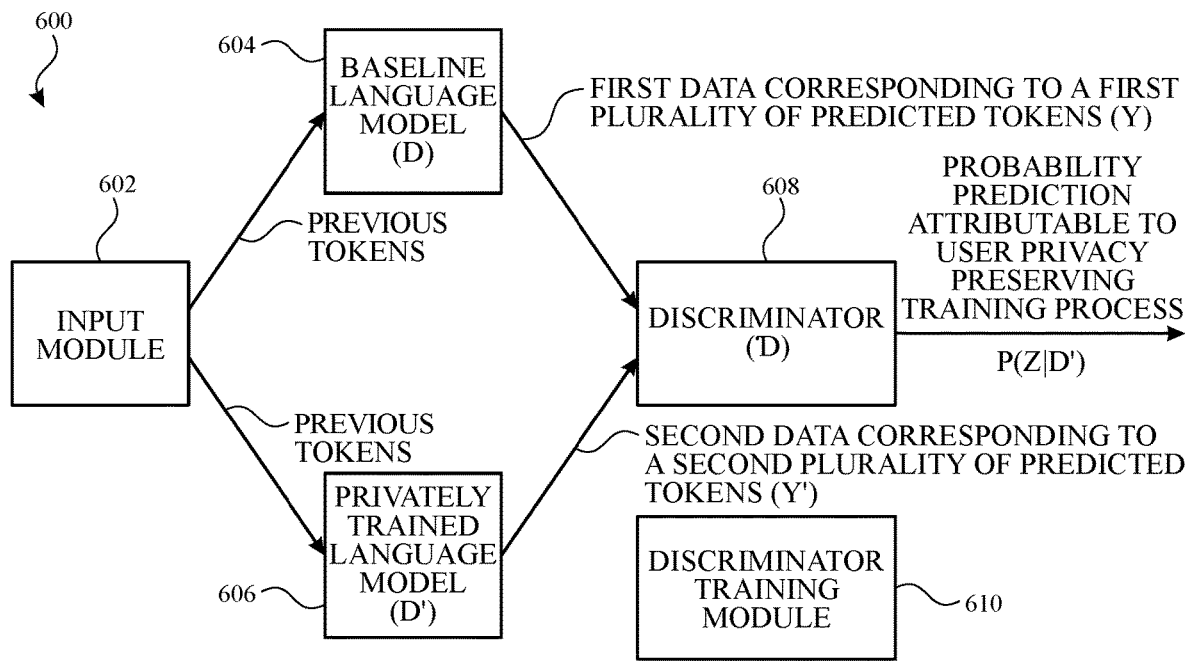
FIG. 6 is a block diagram illustrating an exemplary system for training a discriminator for use in analyzing and validating a language model in accordance with some embodiments.
Figure 7:
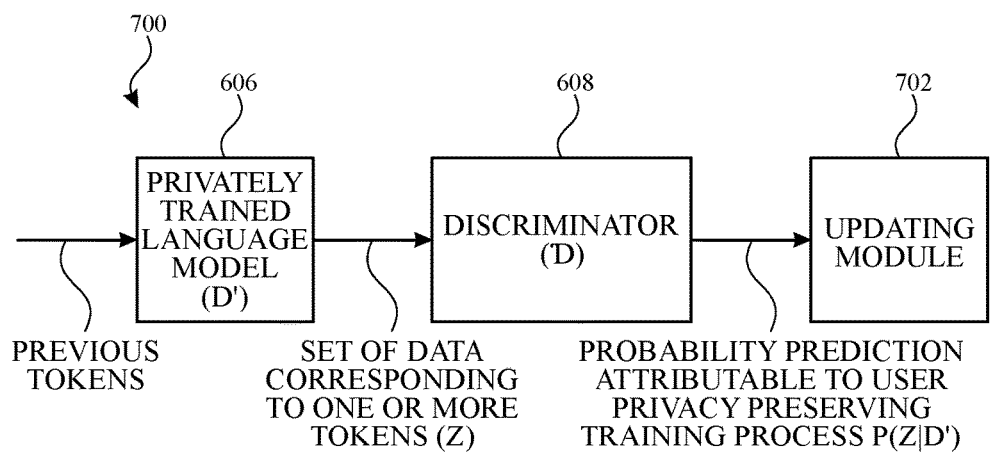
FIG. 7 is a block diagram illustrating an exemplary system for analyzing and validating a language model trained using data that is inaccessible in accordance with some embodiments.
Figure 8A:
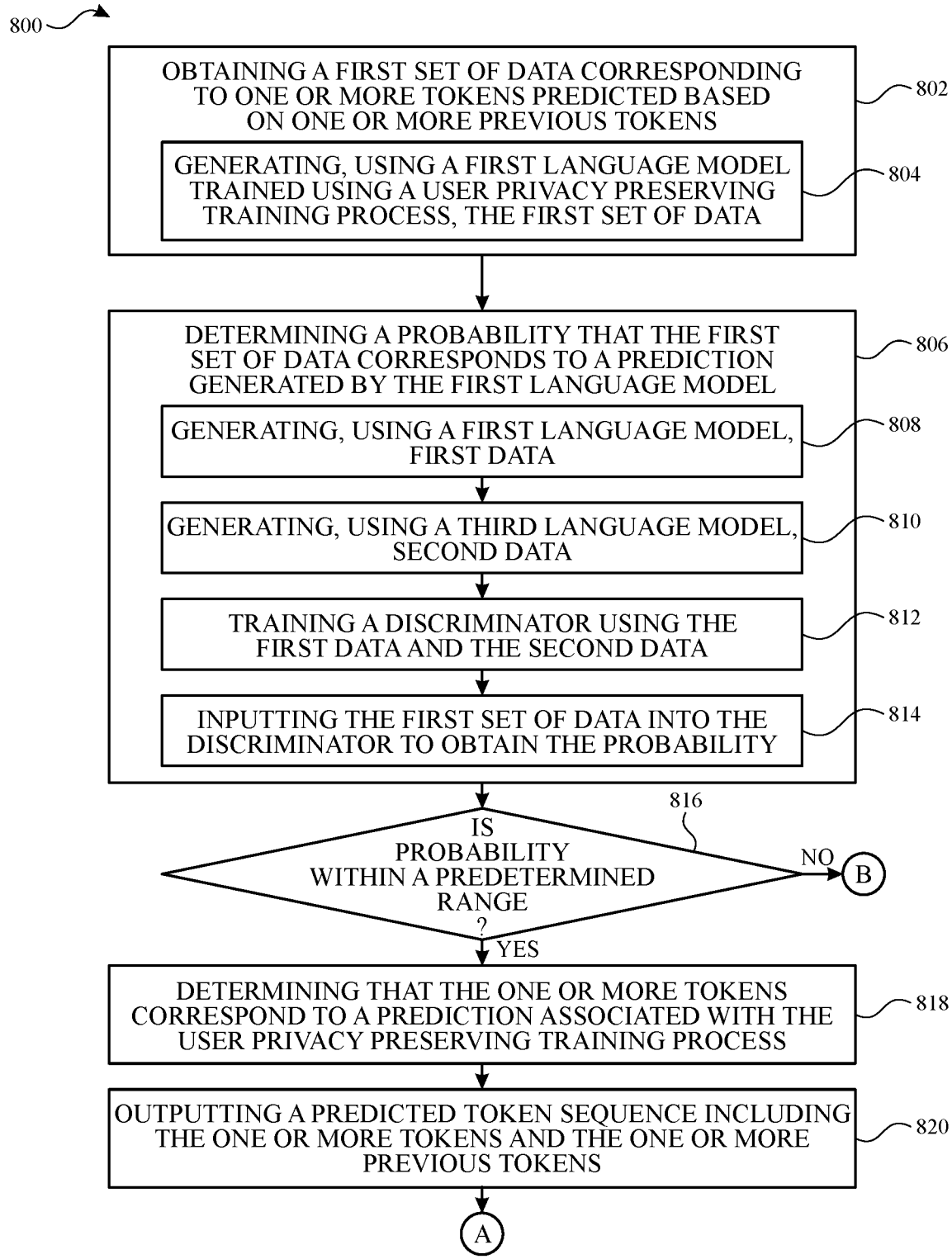
FIGS. 8A-8C are flow diagrams illustrating a process for analyzing and validating a language model trained using data that is inaccessible in accordance with some embodiments.
Figure 8B:
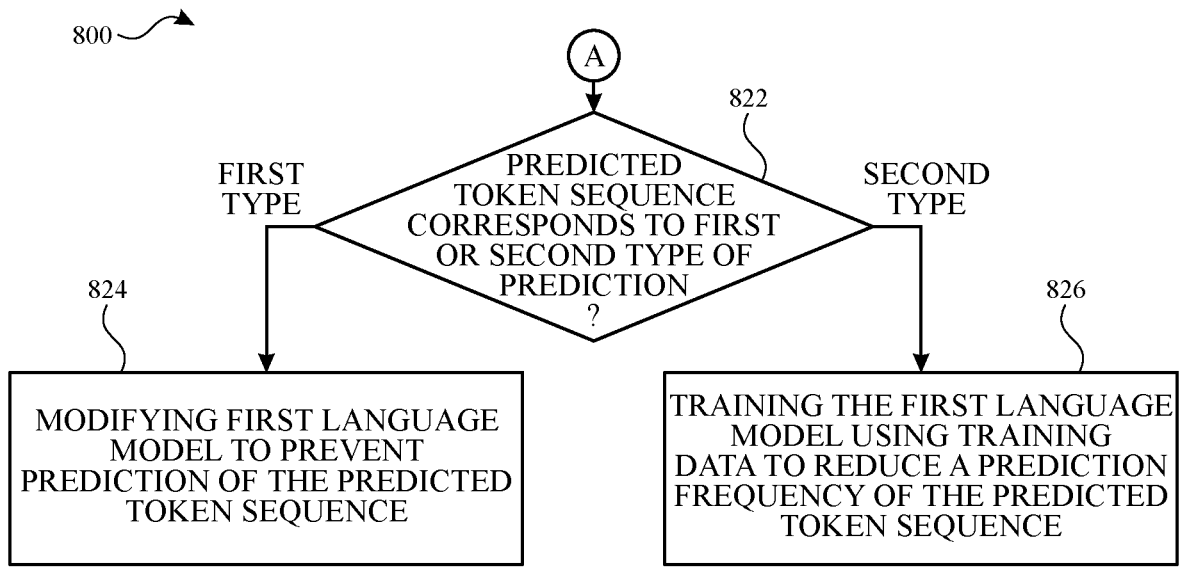
Figure 8C:
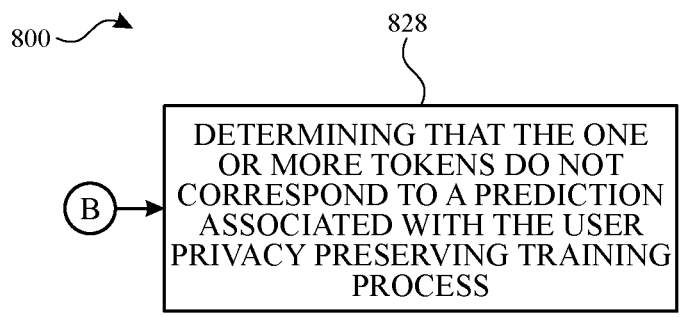

Below, FIGS. 1A-1B, 2, 3, 4A-4B, and 5A-5B provide a description of exemplary devices for analyzing and validating a language model. FIG. 6 illustrates an exemplary system for training a discriminator for use in analyzing and validating a language model. FIG. 7 illustrates an exemplary system for analyzing and validating a language model trained using data that is inaccessible. FIGS. 8A-8C are flow diagrams illustrating a process for analyzing and validating a language model trained using data that is inaccessible.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
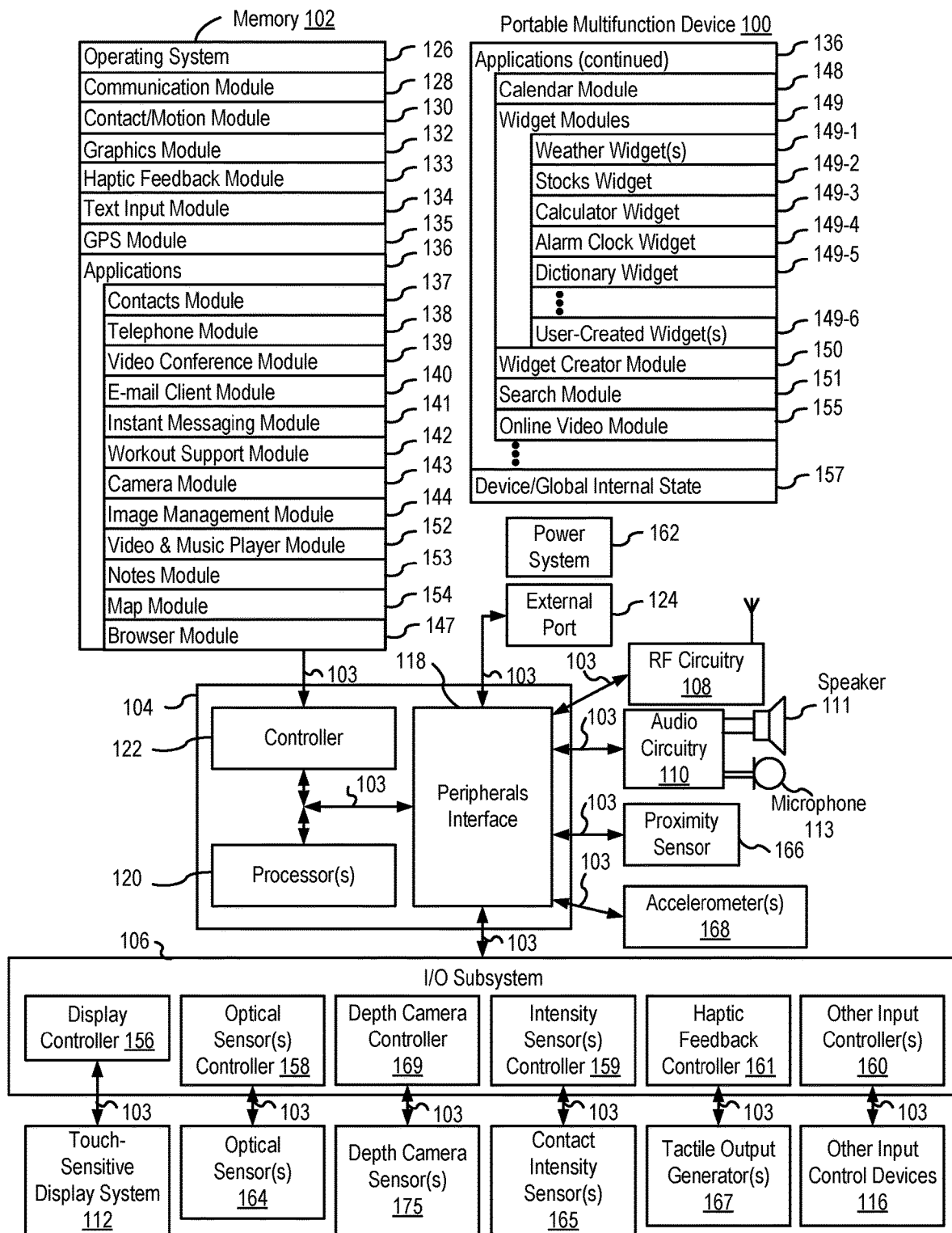
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
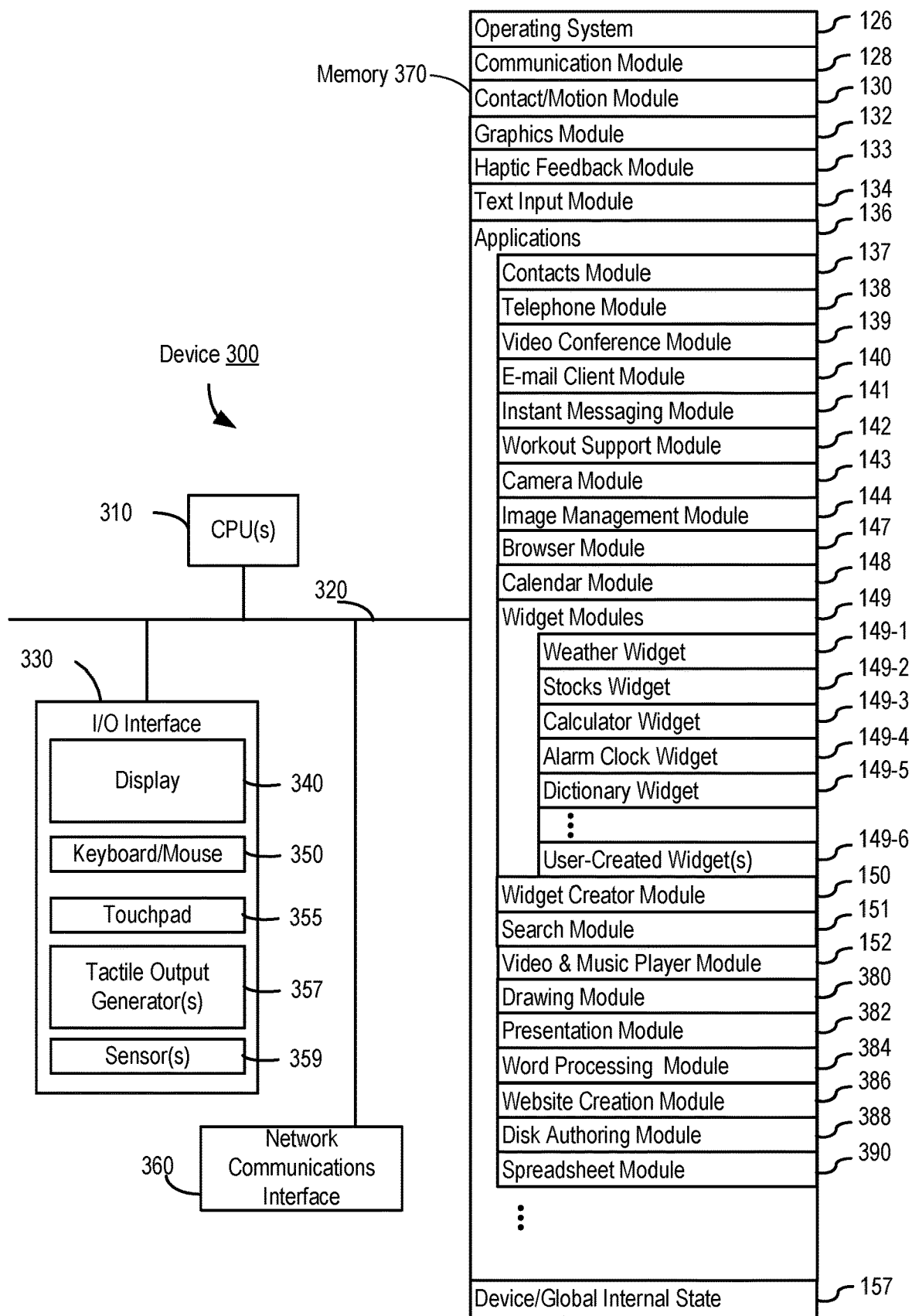
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
  Contacts module 137 (sometimes called an address book or contact list);
  Telephone module 138;
  Video conference module 139;
  E-mail client module 140;
  Instant messaging (IM) module 141;
  Workout support module 142;
  Camera module 143 for still and/or video images;
  Image management module 144;
  Video player module;
  Music player module;
  Browser module 147;
  Calendar module 148;
  Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  Widget creator module 150 for making user-created widgets 149-6;
  Search module 151;
  Video and music player module 152, which merges video player module and music player module;
  Notes module 153;
  Map module 154; and/or
  Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
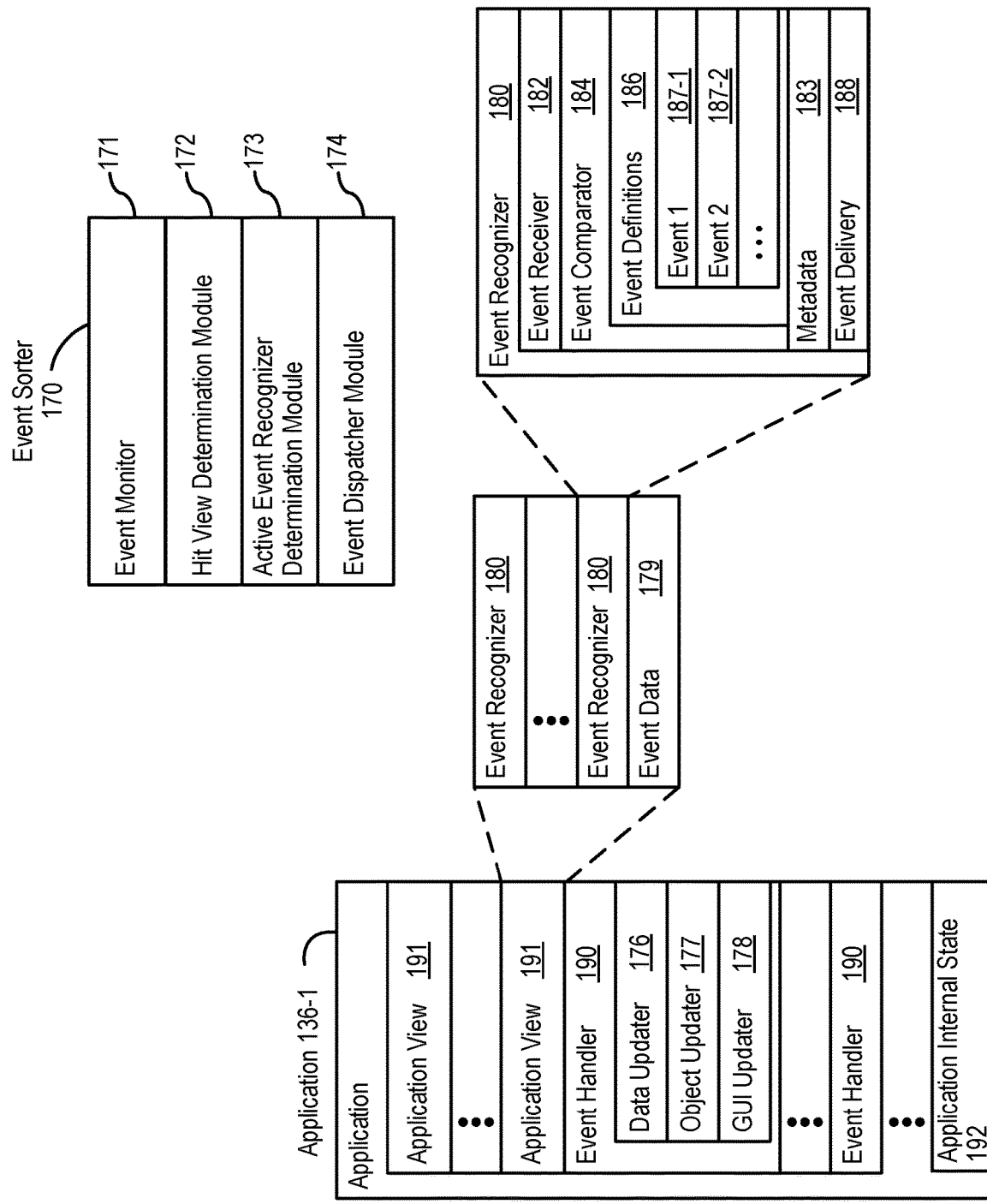
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
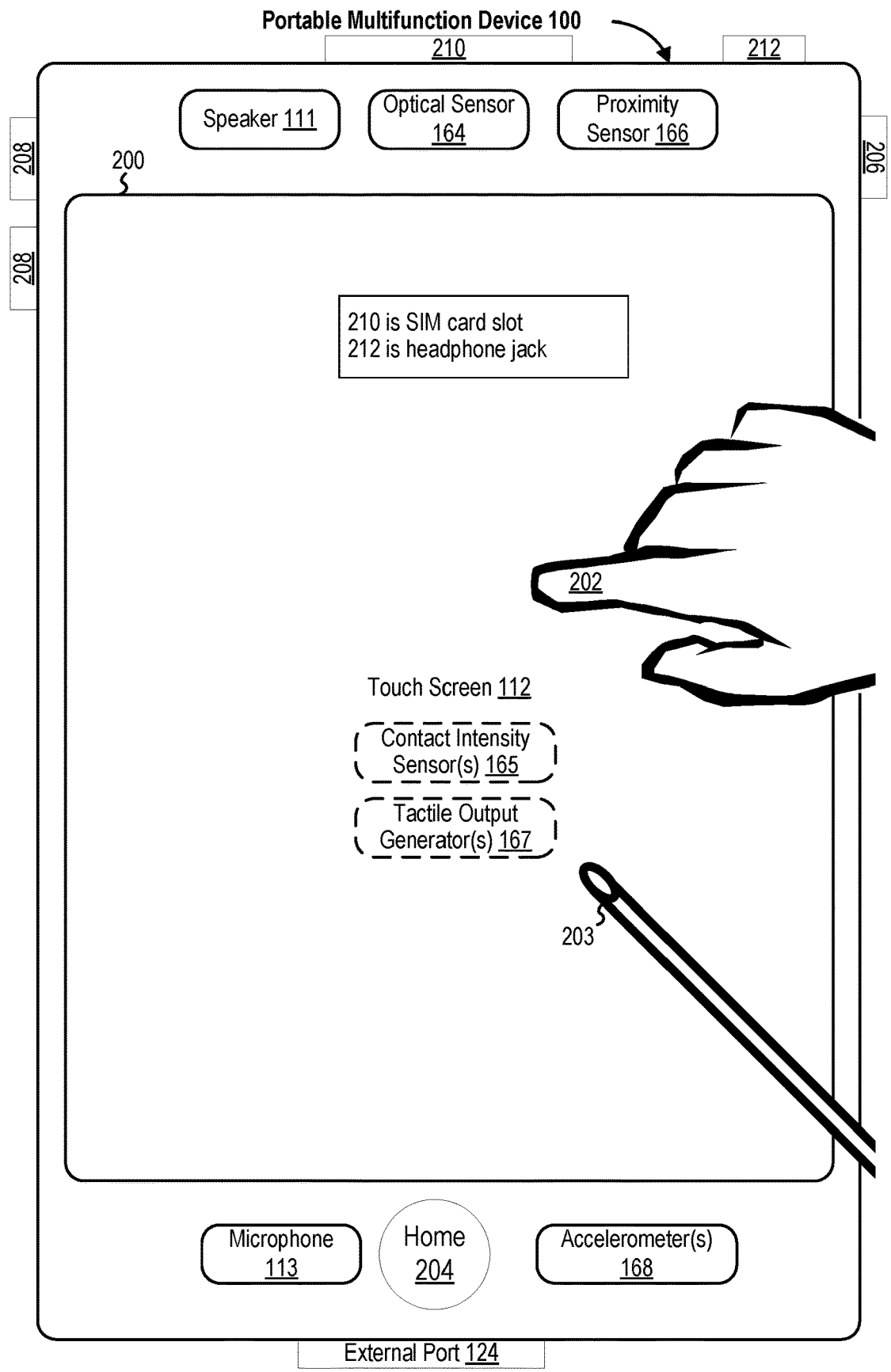
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
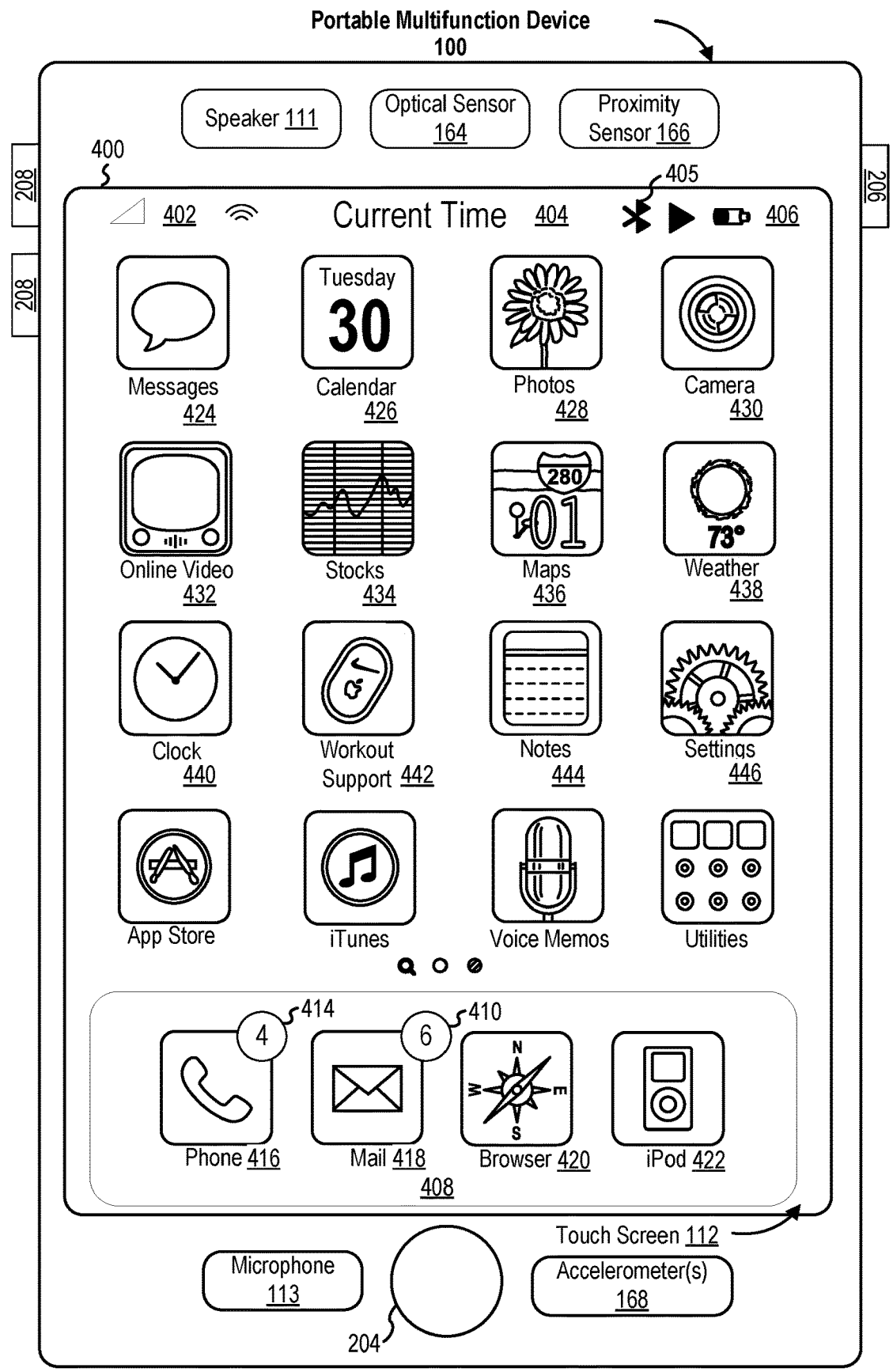
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
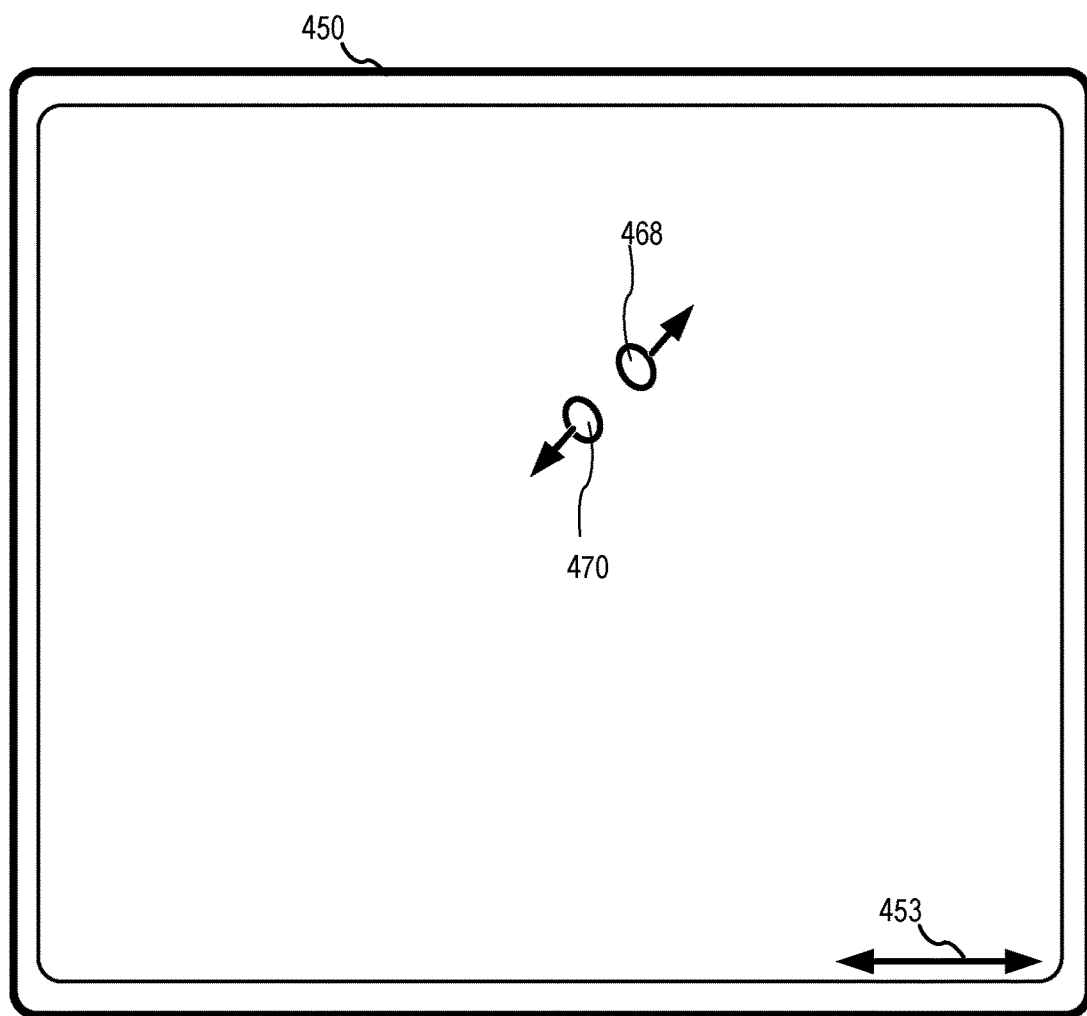
FIG. 4B illustrates an exemplary user interface for a multifunction device with a touch-sensitive surface that is separate from the display in accordance with some embodiments.
Figure 4B:
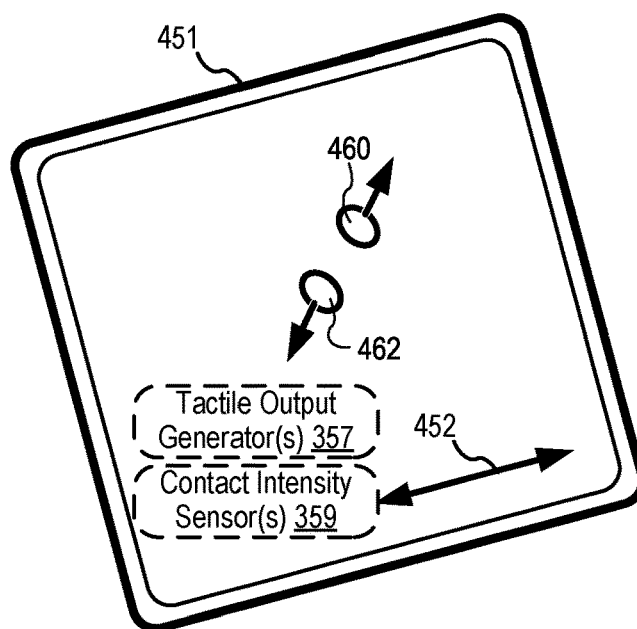

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
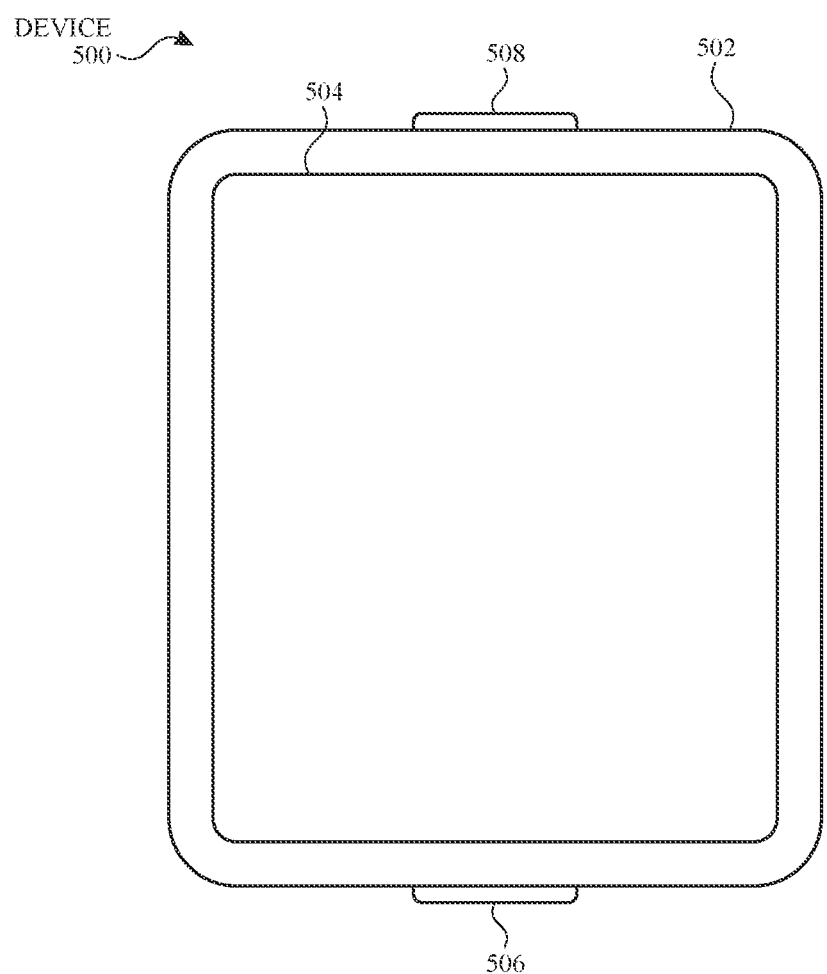
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
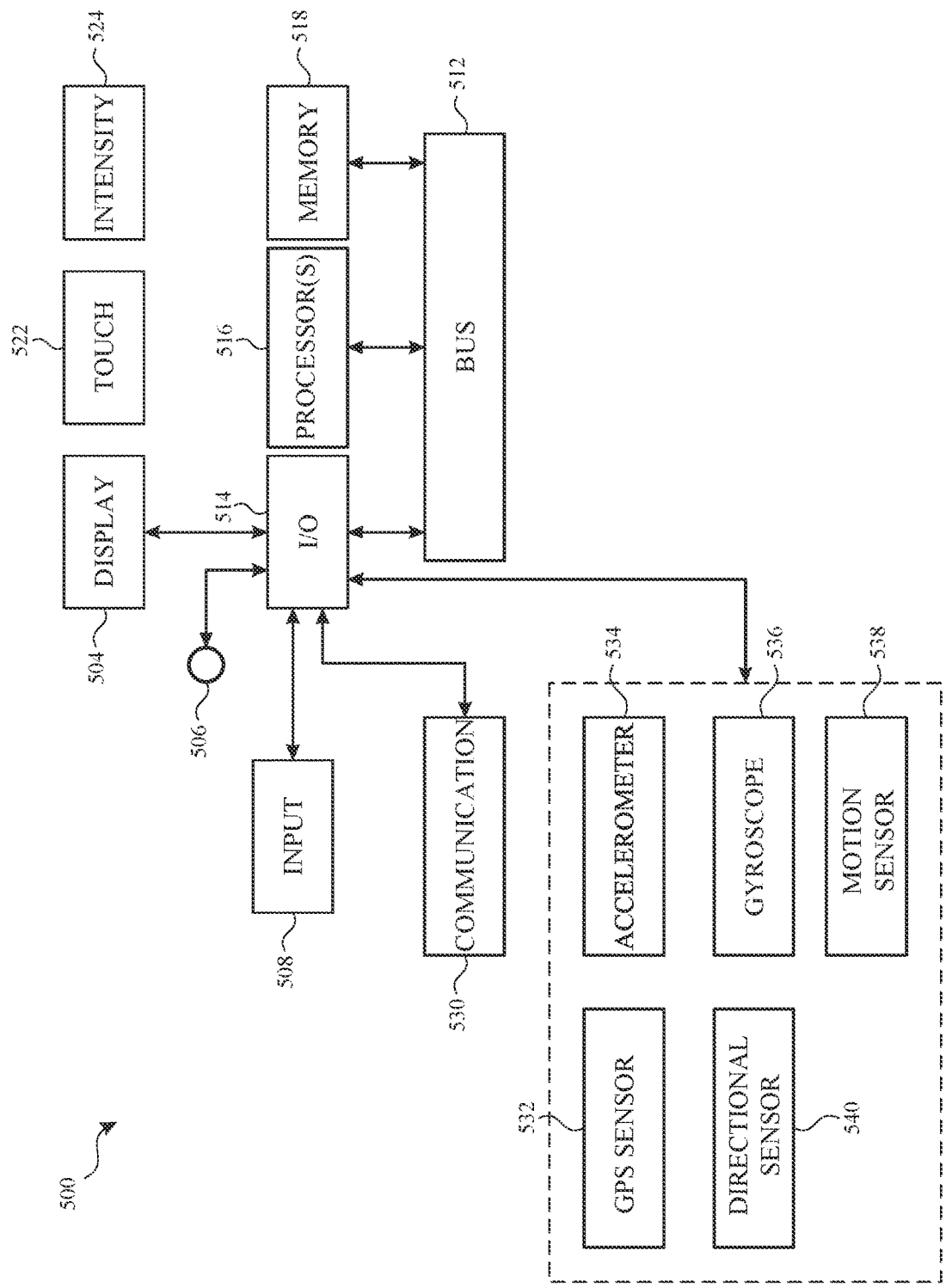
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 800 (FIGS. 8A-C). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

FIG. 6 illustrates an exemplary system 600 for training a discriminator for use in analyzing and validating a language model, in accordance with some embodiments. In some embodiments, system 600 is implemented on one or more electronic devices (e.g., 100, 300, or 500) and the components and functions of system 600 may be distributed in any manner between the devices. In some embodiments, system 600 is implemented on one or more server devices having architectures similar to or the same as devices 100, 300, or 500 (e.g., processors, network interfaces, controllers, and memories) but with greater memory, computing, and/or processing resources than devices 100, 300, or 500. In other embodiments, system 600 is implemented according to a client-server architecture, where the components of system 600 are distributed in any manner between one or more client devices (e.g., 100, 300, or 500) and one or more server devices communicatively coupled to the client device(s).

System 600 is implemented using hardware, software, or a combination of hardware and software to carry out the principles discussed herein. Further, system 600 is exemplary, and thus system 600 can have more or fewer components than shown, can combine two or more components, or can have a different configuration or arrangement of the components. Further, although the below discussion describes functions being performed at a single component of system 600, it is to be understood that such functions can be performed at other components of system 600 and that such functions can be performed at more than one component of system 600.

System 600 includes input module 602. Input module 602 receives as input one or more previous tokens (e.g., previously-determined tokens that provide context for subsequently-received inputs). Generally, a token refers to a basic processing unit for predictive models, meaning that a predictive model can accept previous token(s) as input and predict following token(s) based on the previous tokens. In some embodiments, each token includes (i.e., represents) one or more characters or one or more words (e.g., an individual character, a character sequence, a fragment of a word, a word, a fragment of a phrase, an entire phrase, a fragment of a sentence, an entire sentence), one or more phonemes (e.g., for speech recognition), or one or more spatial coordinates (e.g., for handwriting recognition). For example, the one or more previous tokens are derived from a textual user input, such as an input received from a user typing in a text messaging application. As another example, the one or more previous tokens are derived from a textual representation of a spoken user input, such as a dictation input to a text messaging or email application or a spoken command to a digital assistant operating on an electronic device. As another example, the one or more previous tokens are derived from a textual representation of a user gesture input, such as a handwritten user input entered using a stylus or finger on a touch-sensitive surface of an electronic device.

System 600 includes baseline language model 604. In some embodiments, baseline language model receives the one or more previous tokens from input module 602 and generates first data corresponding to one or more predicted tokens based on the one or more previous tokens. In this manner, language model 604 may predict token(s) based on previous token(s). For example, the first data may include a plurality of output probability distributions Y over the vocabulary associated with baseline language model 604, each output probability distribution corresponding to a particular one or more predicted tokens based on a particular one or more previous (e.g., input) tokens (e.g., a probability distribution for the most likely token(s) to output for a given input context). The vocabulary associated with baseline language model 604 (baseline vocabulary) can represent the number of different tokens baseline language model 604 is capable of predicting. In some embodiments, the first data includes a plurality of N-dimensional vectors (N being the size of the baseline vocabulary) indicating each output probability distribution, where the index of the vector having the highest value corresponds to the most likely predicted token(s). In some embodiments, the one or more predicted tokens may each include (i.e., represent) one or more characters or one or more words (e.g., an individual character, a character sequence, a fragment of a word, a word, a fragment of a phrase, an entire phrase, a fragment of a sentence, an entire sentence), one or more phonemes (e.g., for speech recognition), or one or more spatial coordinates (e.g., for handwriting recognition). For example, the one or more predicted tokens may be predictions for a textual user input, such as an input received from a user typing in a text messaging application. As another example, the one or more predicted tokens may be predictions for a spoken user input, such as a dictation input to a text messaging or email application or a spoken command to a digital assistant operating on an electronic device. As another example, the one or more predicted tokens may be predictions for a user gesture input, such as a handwritten user input entered using a stylus or finger on a touch-sensitive surface of an electronic device.

In some embodiments, baseline language model 604 includes an n-gram model. In some embodiments, baseline language model 604 includes a neural network-based model (e.g., a self-attentive neural network based model, a recurrent neural network (RNN)-based model, a long short term memory (LSTM)-based model, an LSTM-based model with attention, a gated recurrent unit (GRU)-based model, transformer-based models (e.g., vanilla transformer), an XLNet-based model, and so forth). In some embodiments, model 604 is trained according to supervised training techniques known in the art to predict tokens. For example, baseline language model 604 is trained using a static training corpus including a large amount of text samples. As such, baseline language model 604 may largely generate desirable and appropriate text predictions, but may not generate predictions that reflect the evolving idiosyncrasies of a given language (e.g., emerging vocabulary and grammar such as newly coined terms or phrases, more frequently used phrases, and the like). It should be appreciated that analysis and validation of baseline language model 604 may be performed with relative ease. For example, because the training data (e.g., the static training corpus) is accessible to baseline language model 604's administrator, any undesired predictions (e.g., offensive words) determined by baseline language model 604 may be avoided by modifying the training data to remove the data causing the undesired prediction and re-training baseline language model 604 using the modified training data.

System 600 includes privately trained language model 606. In some embodiments, similar to baseline language model 604, privately trained language model 606 includes an n-gram model. In some embodiments, similar to baseline language model 604, privately trained language model 606 includes a neural network-based model (e.g., a self-attentive neural network-based model, an RNN-based model, an LSTM-based model, an LSTM-based model with attention, a GRU-based model, a transformer-based model (e.g., vanilla transformer), an XLNet-based model, and so forth). Privately trained language model 606 also receives one or more previous tokens (e.g., input tokens) from input module 602. In some embodiments, both baseline language model 604 and privately trained language model 606 receive the same previous tokens from input module 602 and generate a (potentially different) plurality of output probability distributions Y' based on the same previous tokens. Specifically, in some embodiments, privately trained language model 606 generates second data corresponding to a plurality of predicted tokens based on the plurality of previous tokens. For example, in a manner consistent with that of model 604, the second data includes a second plurality of output probability distributions Y' over the vocabulary associated with privately trained language model 606 (privately trained vocabulary), where each output probability distribution corresponds to a particular one or more predicted tokens based on a particular one or more previous tokens. As discussed below, in some embodiments, the first and second data (e.g., including a set of probability distributions corresponding to tokens predicted by models 604 and 606) form a training dataset for discriminator 608.

As discussed in further detail below, in some embodiments, privately trained language model 606 is trained using user data to generate predictions that reflect the evolving idiosyncrasies of language (e.g., emerging vocabulary and grammar). Accordingly, the vocabulary associated with baseline language model 604 may differ from that of privately trained language model 606 insofar as the vocabulary associated with baseline language model 604 corresponds to a generic vocabulary (e.g., words/phrases found in a dictionary), but the vocabulary associated with privately trained language model 606 corresponds to an emerging vocabulary in addition to the generic vocabulary. However, as discussed below, techniques for validation and analysis of privately trained language model 606 may differ from those of baseline language model 604 due to inaccessibility of the training data used to train privately trained language model 606.

Specifically, the inaccessibility of the training data used to train privately trained language model 606 is because, in some embodiments, privately trained language model 606 (unlike baseline language model 604) is trained using a user privacy preserving training process. Generally, a user privacy preserving training process describes a training process designed so that a model observer/administrator cannot readily determine if particular training data (e.g., a particular individual's data) was used to generate the model output. As a result, the training data may be inaccessible to the model observer/administrator. Example user privacy preserving training processes include training techniques (e.g., unsupervised training techniques) implementing differential privacy or other encryption techniques. An example training technique implementing differential privacy includes private federated learning (PFL).

In some embodiments, to implement a PFL process, baseline language model 604 is distributed to a plurality of user devices. Each user device individually gathers training data (e.g., user inputted text), building a user data corpus. On each individual user device, the user data corpus is used to update language model parameters used to update (e.g., re-train) baseline language model 604, e.g., so the updated model can account for an emerging vocabulary (as provided by the user inputted text). The updated language model parameters are then output and calibrated noise is introduced to the updated language model parameters to create a set of privacy-protected language model parameters, according to the principles of differential privacy. Each individual user device then transmits the privacy-protected language model parameters to, for instance, a language model server, where the sets of privacy-protected language model parameters from each of the individual user devices are aggregated. Based on the aggregated privacy-protected language model parameters, baseline language model 604 is updated (e.g., re-trained) to create privately trained language model 606. Accordingly, in such examples, although privately trained language model 606 is trained on user data, user privacy is preserved, as the respective user data corpora are not accessed outside of the respective individual user devices, and the introduction of calibrated noise may prevent anyone with access to the sets of privacy-protected language model parameters from being able to derive the user data.

A user privacy preserving training process, such as the PFL process described above, may prevent inadvertent, undesirable, or unlawful access to user data, while allowing privately trained language model 606 to generate predictions to account for the evolution of language, such as by capturing emerging vocabulary and grammar. However, the user privacy preserving training process may also introduce undesirable deviations into the language model. For example, it would be desirable for a language model to quickly update to promote prediction of the idiosyncratic expression "shelter in place" (if the usage frequency of the expression is increasing as determined from user data), but not for a language model to predict an offensive slur or have a tendency towards gender bias, such as always predicting masculine pronouns in association with the occupation "doctor." While the most direct way to find these undesirable deviations may be to examine user data, the use of a user privacy preserving process to update language models prevents access to (e.g., precludes supervision of) the user data. At the same time, the scale of language models compounds the difficulty of finding these undesirable deviations potentially introduced by the user privacy preserving training process. For example, for the vast majority of cases, baseline language model 604 and privately trained language model 606 may generate identical predictions, making specific predictions attributable to the user privacy training process difficult to identify. As such, a system for efficiently analyzing and validating large-scale language models without direct access to user data may be desirable.

Thus, in order to analyze and validate a large-scale language model trained using a user privacy preserving training process, the systems and processes described herein can be used to determine which predictions from the language model are attributable to the user privacy preserving training process. By identifying the predictions attributable to the user privacy preserving training process, the most salient differences between a supervised language model (such as baseline language model 604) and a language model trained using a user privacy preserving training process (such as privately trained language model 606), can be efficiently examined without the need to access user data. In some embodiments, predictions attributable to the user privacy preserving training process can be identified by computing an analytical divergence measure (e.g., a Jensen-Shannon divergence) between the first and second data (e.g., each including a set of probability distributions corresponding to tokens predicted by respective models 604 and 606), aggregated over all generated data. In some embodiments, predictions attributable to the user privacy preserving training process can be identified using discriminator 608. Using discriminator 608 as discussed below may more precisely identify differences between supervised language models and language models trained using the user privacy preserving training process, e.g., compared to computing various analytical divergence measures.

In some embodiments, system 600 includes discriminator 608. In some embodiments, discriminator 608 includes a neural network (e.g., a self-attentive neural network or RNN). In some embodiments, discriminator 608 determines a probability that given input set of data corresponding to one or more predicted tokens is attributable to (e.g., learned through) the user privacy preserving training process. For example, discriminator 608 determines (e.g., outputs) a probability that the given input set of data (e.g., a given output probability distribution for one or more predicted tokens over a vocabulary associated with a given language model) corresponds to a prediction generated by privately trained language model 606. In some examples, the probability is relative to a probability that the input set of data corresponds to a prediction generated by baseline language model 604 (e.g., by a language model not trained using a user privacy preserving training process). Techniques for training discriminator 608 to perform the above are now discussed.

In some embodiments, system 600 includes discriminator training module 610. Discriminator training module 610 trains discriminator 608 using the first data and the second data discussed above (e.g., pluralities of output probability distributions generated by baseline language model 604 and privately trained language model 606 that each correspond to one or more tokens predicted based on the same one or more previous tokens). For example, training module 610 trains discriminator 608 to distinguish between predictions attributable to versus not attributable to the user privacy preserving training process. More formally, define Y as the output probability distribution (over the vocabulary associated with baseline language model 604) corresponding to one or more tokens predicted by baseline model 604, and define Y' as the output probability distribution (over the vocabulary associated with privately trained language model 606) corresponding to one or more tokens predicted by privately trained language model 606. Output probability distribution Y is drawn from D (the overall probability distribution for token(s) predicted by baseline language model 604), while output probability distribution Y' is drawn from D' (the overall probability distribution for token(s) predicted by privately trained language model 606). Accordingly, discriminator 608 may be trained to measure the divergence between the distributions D and D'.

In some embodiments, training discriminator 608 in such manner includes determining the parameters (e.g., weight matrices) of discriminator 608 to optimize (e.g., minimize) a cost function. For example, discriminator 608 (denoted by D) is trained using the cost function so that D(Y)=0 when Y~D and D(Y')=1 when Y'~D'. An example cost function includes the cross entropy loss:

$$K(D) = \mathbb{E}_{Y \sim D}\{\log[D(Y)]\} + \mathbb{E}_{Y \sim D'}\{\log[1-D(Y)]\}$$

where K(D) denotes the overall cost function.

Accordingly, once trained, discriminator 608 determines a probability P(Z|D') that a given output probability distribution Z for one or more predicted tokens is drawn from D' (i.e., the privately trained language model 606) rather than D (i.e., the baseline language model 704). Thus, in the case where discriminator 608 is a classifier D:

$$P(Z \mid D) = \begin{cases} < 0.5 \text{ if } Z \text{ behaves more like it is drawn from } D' \\ 0.5 \text{ if } Z \quad \text{could be equally drawn from } D \text{ or } D' \\ > 0.5 \text{ if } Z \text{ behaves more like it is drawn from } D \end{cases}$$

In a practical application, as explained above, baseline language model 604 is trained using a static training corpus including a large amount of text samples (e.g., a large-scale training corpus). Accordingly, baseline language model 604 generates predictions largely consistent with the commonly used vocabulary of a given language, so the two overall distributions D and D' will be very similar, differing only as far as a relatively small emerging vocabulary privately trained language model 606 is trained to reflect. However, as that emerging vocabulary is so small relative to the massive scale of the overall language vocabulary, manual detection (e.g., spot checking) of where the two overall distributions differ is virtually infeasible. As the difference between the two overall distributions D and D' is small, P(Z|D') will be close to 0.5 for most output probability distributions. Where P(Z|D') is substantially greater than 0.5, given output probability distribution Z corresponds to a prediction generated by privately trained language model 606 (i.e., a prediction attributable to the user privacy preserving training process). Likewise, where P(Z|D') is substantially less than 0.5, given output probability distribution Z corresponds to a prediction generated by baseline language model 604 (i.e., a prediction not attributable to the user privacy preserving training process).

FIG. 7 illustrates an exemplary system 700 for analyzing and validating a language model, in accordance with some embodiments. In some embodiments, system 700 is implemented on one or more electronic devices (e.g., devices 100, 300, or 500) and the functions of system 700 may be distributed in any manner between the devices. In some embodiments, system 700 is implemented on one or more server devices having architectures similar to or the same as devices 100, 300, or 500 (e.g., processors, network interfaces, controllers, and memories) but with greater memory, computing, and/or processing resources than devices 100, 300, or 500. In other embodiments, system 700 is implemented according to a client-server architecture, where the components of system 700 are distributed in any manner between one or more client devices (e.g., 100, 300, or 500) and one or more server devices communicatively coupled to the client device(s).

System 700 is implemented using hardware, software, or a combination of hardware and software to carry out the principles discussed herein. Further, system 700 is exemplary, and thus system 700 can have more or fewer components than shown, can combine two or more components, or can have a different configuration or arrangement of the components. Further, although the below discussion describes functions being performed at a single component of system 700, it is to be understood that such functions can be performed at other components of system 700 and that such functions can be performed at more than one component of system 700.

System 700 includes privately trained language model 606. Privately trained language model 606 generates a first set of data corresponding to one or more predicted tokens based on one or more previous tokens (e.g., one or more previous tokens received as input by privately trained language model 606), consistent with the techniques discussed above with respect to FIG. 6. In some embodiments, the first set of data includes a probability distribution Z (i.e., over the vocabulary associated with privately trained language model 606) corresponding to the one or more predicted tokens.

System 700 further includes discriminator 608. In some examples, discriminator 608 determines a probability that the first set of data corresponds to a prediction generated by privately trained language model 606 (i.e., that the first set of data is attributable to the user privacy preserving training process), as discussed above with respect to FIG. 6.

System 700 includes updating module 702 Updating module 702 determines whether the probability determined by discriminator 608 falls within various predetermined ranges. In some embodiments, if updating module 702 determines that the probability falls within a first predetermined range (e.g., a probability between a predetermined number larger than 0.5 and 1, in accordance with the description of FIG. 6, above), updating module 702 determines that the one or more predicted tokens correspond to a prediction associated with (e.g., attributable to) the user privacy preserving training process. In some embodiments, if updating module 702 determines that the probability falls within the first predetermined range, updating module 702 further outputs a predicted token sequence including the one or more previous tokens and the one or more predicted tokens. The predicted token sequence may thus represent an emerging vocabulary, e.g., words or phrases with an increased usage frequency due to current events, cultural/generational language changes, and the like. In this manner, updating module 702 can output predictions attributable to the user-privacy preserving training process for model administrator inspection, despite the user data causing the prediction being inaccessible to the administrator.

For example, the one or more previous tokens could represent the sentence fragment, "Last month, I started." Based on that input context, privately trained language model 606 generates a set of data corresponding to a plurality of predicted tokens. In some embodiments, where discriminator 608 is trained in accordance with the techniques described above, the probability determined by discriminator 608 would be close to 0.5 in a case where the plurality of predicted tokens include (i.e., represent) the words "a new job" or "working out," as those predictions could be equally attributable to the user privacy preserving training process or to the baseline training process. Likewise, the determined probability may be substantially greater than 0.5 in a case where the plurality of predicted tokens are the words "sheltering in place," as "sheltering in place" represents an emerging vocabulary associated with a recent global pandemic and may thus be likely attributable to the user privacy preserving training process. Accordingly, as the determined probability is within the first predetermined range (e.g., a probability between a predetermined number greater than 0.5 and less than 1) the predicted token sequence "Last month, I started sheltering in place" can be output to determine its desirability (e.g., flagged for review by the model administrator). Thus, a determination of whether the predicted token sequence corresponds to a desirable emerging vocabulary or an undesirable deviation can be made without the need (or ability) to access any user data.

In some embodiments, the predicted token sequence (e.g., including the one or more previous tokens and one or more predicted tokens) may correspond to a first type of prediction. The first type of prediction includes a prediction determined to be objectionable such as: a lewd term, an offensive slur, multiple words that are innocuous when read individually but take on an offensive meaning together, or an induced distortion of vocabulary (e.g., where an outside actor has induced prediction of a promotional or otherwise undesirable word/phrase by feeding large amounts of targeted user data into the systems described above, a practice known as "data poisoning"). In some embodiments, when the predicted token sequence represents this first type of prediction, privately trained language model 606 can accordingly be updated by updating module 702 to prevent prediction of the objectionable predicted token sequence. For example, updating module 702 may modify privately trained language model 606 to include a rule to not predict the predicted token sequence, e.g., not predict the token(s) to form the objectionable prediction given the previous token(s).

In some embodiments, the predicted token sequence may correspond to a second type of prediction, which may include an undesirable systemic bias in privately trained language model 608. Systemic bias may be an inherent tendency to produce a particular outcome resulting from human biases, such as gender bias, racial bias, and so forth. Systemic bias may thus differ from particular objectionable predictions (e.g., the first type of prediction), as a single word/phrase may reflect the first type of prediction, while systemic bias may be present in many instances and may not be specific to any particular word/phrase. For example, systemic bias is seen in a system that tends to predict masculine pronouns based on an input context relating to the profession "doctor" as opposed to predicting a more balanced variety of pronouns. Where this second type of undesirable prediction is determined, the privately trained language model 606 can accordingly be modified by updating module 702 by training privately trained language model 606 using training data to reduce a prediction frequency of the predicted token sequence, the training data being selected based on the predicted token sequence to reduce a frequency of predictions of the second type, e.g., to reduce prediction frequency of "he" and increase a prediction frequency of "she." For example, this modification may involve re-training privately trained language model 606 using a corpus of targeted training material including writings about doctors of other genders.

In some embodiments, if updating module 702 determines that the probability falls within a second predetermined range (e.g., a probability between a predetermined number less than 0.5 and greater than 0, in accordance with the description of FIG. 6, above), updating module 702 determines the one or more predicted tokens do not correspond to a prediction associated with (e.g., attributable to) the user privacy preserving training process. Determining when predictions are likely not attributable to the user privacy preserving training process may indicate instances where the user privacy preserving training process is discounting user data (e.g., not appropriately updating the language model). This determination may also be valuable to make, as aside from the examples of objectionable predicted tokens and systemic bias, capturing emergent vocabulary and other evolutions of language may be generally desirable in maintaining a language model. In this manner, updating module 702 can determine predictions not attributable to the user privacy preserving training process for model administrator inspection, despite the user data causing the prediction being inaccessible to the administrator.

FIGS. 8A-C illustrate a flow diagram of process 800 for analyzing and validating a language model using an electronic device in accordance with some embodiments. In some embodiments, process 800 is performed at one or more devices (e.g., 100, 300, 500) each having one or more processors and memory. In some embodiments, process 800 is performed using a client-server system, with the operations of process 800 divided up in any manner between the client device(s) (e.g., 100, 300, 500) and the server. Some operations in process 800 are, optionally, combined, the orders of some operations are, optionally, changed, and some operations are, optionally, omitted.

In some embodiments, the electronic device (e.g., 500) is a computer system. The computer system is optionally in communication (e.g., wired communication, wireless communication) with a display generation component and with one or more input devices. The display generation component is configured to provide visual output, such as display via a CRT display, display via an LED display, or display via image projection. In some embodiments, the display generation component is integrated with the computer system. In some embodiments, the display generation component is separate from the computer system. The one or more input devices are configured to receive input, such as a touch-sensitive surface receiving user input. In some embodiments, the one or more input devices are integrated with the computer system. In some embodiments, the one or more input devices are separate from the computer system. Thus, the computer system can transmit, via a wired or wireless connection, data (e.g., image data or video data) to an integrated or external display generation component to visually produce the content (e.g., using a display device) and can receive, a wired or wireless connection, input from the one or more input devices.

At block 802, a first set of data corresponding to one or more tokens predicted based on one or more previous tokens (e.g., previous tokens received from input module 602) is obtained. In some embodiments, the first set of data is generated using a first language model trained using a user privacy preserving training process (e.g., privately trained language model 606), as shown in block 804. In some embodiments, the user privacy preserving training process includes a PFL process such as the one described with respect to FIG. 6. In some embodiments, the first set of data includes a probability distribution for the one or more predicted tokens over a vocabulary associated with the first language model. In some embodiments, the one or more previous tokens include any of one or more characters or one or more words. In some examples, the one or more predicted tokens include any of one or more character or one or more words.

At block 806, a probability that the first set of data corresponds to a prediction generated by the first language model trained using the user privacy preserving training process is determined (e.g., by discriminator 608). In some embodiments, the probability is relative to a probability that the first set of data corresponds to a prediction generated by a second language model not trained using the user privacy preserving training process (e.g., baseline language model 604). In some embodiments, determining the probability includes generating, using the first language model (e.g., privately trained language model 606), first data corresponding to a first plurality of predicted tokens, and generating, using a third language model not trained using the user privacy preserving process (e.g., baseline language model 604), second data corresponding to a second plurality of predicted tokens, as shown in blocks 808 and 810, respectively. In some embodiments, the first data and second data are generated using a same plurality of previous tokens. In some embodiments, a discriminator (e.g., discriminator 608) is trained using the first data and second data, as shown in block 812. In some embodiments, determining the probability includes inputting the first set of data into the discriminator to obtain the probability, as shown in block 814.

At block 816, a determination is made (e.g., by updating module 702) of whether the probability is within a predetermined range. In accordance with a determination that the probability is within the predetermined range, at block 818, a determination is made (e.g., by updating module 702) that the one or more tokens correspond to a prediction associated with the user privacy preserving training process. At block 820, a predicted token sequence including the one or more tokens and the one or more previous tokens is output (e.g., by updating module 702). In some embodiments, the predicted token sequence represents an emerging vocabulary.

Referring now to FIG. 8B, in some examples, further in accordance with a determination that the probability is within the predetermined range, at block 822, a determination is made whether the predicted token sequence corresponds to a first type of prediction. In some embodiments, in accordance with a determination that the predicted token sequence corresponds to the first type of prediction, the first language model is modified (e.g., by updating module 702) to prevent prediction of the predicted token sequence, as shown in block 824. In some embodiments, the first type of prediction includes a prediction determined to be objectionable. In some embodiments, in accordance with a determination that the predicted token sequence corresponds to a second type of prediction, the first language model is trained (e.g., by updating module 702) using training data to reduce a prediction frequency of the predicted token sequence, the training data being selected based on the predicted token sequence to reduce a frequency of predictions of the second type, as shown in block 826. In some embodiments, the second type of prediction includes a prediction representing systemic bias in the first language model (such as always predicting masculine pronouns based on an input context relating to the profession "doctor").

Referring now to FIG. 8C, in some examples, in accordance with a determination at block 816 that the probability is not within the predetermined range, and further in accordance with a determination that the probability is within a second predetermined range (e.g., by updating module 702), a determination is made (e.g., by updating module 702) at block 828 that the one or more tokens do not correspond to a prediction associated with the user privacy preserving training process.

The operations described above with reference to FIGS. 8A-C are optionally implemented by components depicted in FIGS. 6 and 7. For example, the operations of process 800 may be implemented by input module 602, baseline language model 604, privately trained language model 606, discriminator 608, and updating module 702, or a sub-combination thereof. It would be clear to a person having ordinary skill in the art how other processes are implemented based on the components depicted in FIGS. 6 and 7.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the effectiveness and relevancy of language models. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to better predict text relevant to the user using a language model. Accordingly, use of such personal information data may enable improved text prediction. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of analyzing and validating language models, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, language models can be updated based on non-personal information data or a bare minimum amount of personal information, such as the content being requested by the device associated with a user, other non-personal information available to the language model services, or publicly available information.

What is claimed is:

1. An electronic device, comprising:
one or more processors;
a memory; and
one or more programs, wherein the one or more programs are stored in the memory and configured to be executed by the one or more processors, the one or more programs including instructions for:
obtaining a first set of data corresponding to one or more tokens predicted based on one or more previous tokens, wherein the one or more previous tokens are derived from a textual user input, a textual representation of a spoken user input, or a textual representation of a user gesture input;
determining a probability that the first set of data corresponds to a prediction generated by a first language model trained using a user privacy preserving training process, wherein the probability is relative to a second probability that the first set of data corresponds to a prediction generated by a second language model not trained using the user privacy preserving training process; and
in accordance with a determination that the probability is within a predetermined range:
determining that the one or more tokens correspond to a prediction associated with the first language model trained using the user privacy preserving training process; and
outputting a predicted token sequence including the one or more tokens and the one or more previous tokens.

2. The electronic device of claim 1, wherein the first set of data includes a probability distribution for the one or more predicted tokens over a vocabulary associated with the first language model.

3. The electronic device of claim 1, the one or more programs further including instructions for:
generating, using the first language model, the first set of data based on the one or more previous tokens.

4. The electronic device of claim 1, wherein the user privacy preserving training process includes a private federated learning process.

5. The electronic device of claim 1, wherein the predicted token sequence represents an emerging vocabulary.

6. The electronic device of claim 1, wherein determining the probability includes:
inputting the first set of data into a discriminator to obtain the probability.

7. The electronic device of claim 6, the one or more programs further including instructions for:
generating, using the first language model, first data corresponding to a first plurality of predicted tokens;
generating, using a third language model, second data corresponding to a second plurality of predicted tokens, wherein:
the third language model is not trained using the user privacy preserving training process; and
the first data and the second data are generated based on a same plurality of previous tokens; and
training the discriminator using the first data and the second data.

8. The electronic device of claim 1, the one or more programs further including instructions for:
in accordance with a determination that the probability is not within the predetermined range and is within a second predetermined range, determining that the one or more tokens do not correspond to a prediction associated with the user privacy preserving training process.

9. The electronic device of claim 1, wherein the one or more predicted tokens include any of one or more characters or one or more words.

10. The electronic device of claim 1, wherein the one or more previous tokens include any of one or more characters or one or more words.

11. The electronic device of claim 1, wherein determining the probability that the first set of data corresponds to a prediction generated by the first language model trained using the user privacy preserving training process includes determining a probability that the prediction is attributable to the user privacy preserving training process.

12. The electronic device of claim 1, the one or more programs including instructions for:
further in accordance with the determination that the probability is within the predetermined range, modifying the first language model.

13. The electronic device of claim 12, wherein modifying the first language model includes:
in accordance with a determination that the predicted token sequence corresponds to a first type of prediction, modifying the first language model to prevent prediction of the predicted token sequence; and
in accordance with a determination that the predicted token sequence corresponds to a second type of prediction, training the first language model using training data to reduce a prediction frequency of the predicted token sequence, the training data being selected based on the predicted token sequence to reduce a frequency of predictions of the second type.

14. The electronic device of claim 13, wherein the first type of prediction includes a prediction determined to be objectionable.

15. The electronic device of claim 13, wherein the second type of prediction includes a prediction representing systemic bias in the first language model.

16. A non-transitory computer readable storage medium storing one or more programs, the one or more programs comprising instructions, which when executed by one or more processors of an electronic device, cause the electronic device to:
obtain a first set of data corresponding to one or more tokens predicted based on one or more previous tokens, wherein the one or more previous tokens are derived from a textual user input, a textual representation of a spoken user input, or a textual representation of a user gesture input;
determine a probability that the first set of data corresponds to a prediction generated by a first language model trained using a user privacy preserving training process, wherein the probability is relative to a second probability that the first set of data corresponds to a prediction generated by a second language model not trained using the user privacy preserving training process; and
in accordance with a determination that the probability is within a predetermined range:
determine that the one or more tokens correspond to a prediction associated with the first language model trained using the user privacy preserving training process; and
output a predicted token sequence including the one or more tokens and the one or more previous tokens.

17. The non-transitory computer readable storage medium of claim 16, wherein the first set of data includes a probability distribution for the one or more predicted tokens over a vocabulary associated with the first language model.

18. The non-transitory computer readable storage medium of claim 16, the one or more programs further comprising instructions, which when executed by one or more processors of an electronic device, cause the electronic device to: generate, using the first language model, the first set of data based on the one or more previous tokens.

19. The non-transitory computer readable storage medium of claim 16, wherein the user privacy preserving training process includes a private federated learning process.

20. The non-transitory computer readable storage medium of claim 16, wherein the predicted token sequence represents an emerging vocabulary.

21. The non-transitory computer readable storage medium of claim 16, the one or more programs further comprising instructions, which when executed by one or more processors of an electronic device, cause the electronic device to: in accordance with a determination that the probability is not within the predetermined range and is within a second predetermined range, determine that the one or more tokens do not correspond to a prediction associated with the user privacy preserving training process.

22. The non-transitory computer readable storage medium of claim 16, wherein the one or more predicted tokens include any of one or more characters or one or more words.

23. The non-transitory computer readable storage medium of claim 16, wherein the one or more previous tokens include any of one or more characters or one or more words.

24. The non-transitory computer readable storage medium of claim 16, wherein determining the probability that the first set of data corresponds to a prediction generated by the first language model trained using the user privacy preserving training process includes determining a probability that the prediction is attributable to the user privacy preserving training process.

25. The non-transitory computer readable storage medium of claim 16, wherein determining the probability includes: inputting the first set of data into a discriminator to obtain the probability.

26. The non-transitory computer readable storage medium of claim 25, the one or more programs further comprising instructions, which when executed by one or more processors of an electronic device, cause the electronic device to:
generate, using the first language model, first data corresponding to a first plurality of predicted tokens;
generate, using a third language model, second data corresponding to a second plurality of predicted tokens, wherein:
the third language model is not trained using the user privacy preserving training process; and
the first data and the second data are generated based on a same plurality of previous tokens; and
train the discriminator using the first data and the second data.

27. The non-transitory computer readable storage medium of claim 16, the one or more programs further comprising instructions, which when executed by one or more processors of an electronic device, cause the electronic device to:
further in accordance with the determination that the probability is within the predetermined range, modify the first language model.

28. The non-transitory computer readable storage medium of claim 27, wherein modifying the first language model includes:
in accordance with a determination that the predicted token sequence corresponds to a first type of prediction, modifying the first language model to prevent prediction of the predicted token sequence; and
in accordance with a determination that the predicted token sequence corresponds to a second type of prediction, training the first language model using training data to reduce a prediction frequency of the predicted token sequence, the training data being selected based on the predicted token sequence to reduce a frequency of predictions of the second type.

29. The non-transitory computer readable storage medium of claim 28, wherein the first type of prediction includes a prediction determined to be objectionable.

30. The non-transitory computer readable storage medium of claim 28, wherein the second type of prediction includes a prediction representing systemic bias in the first language model.

31. A method for validating language models, the method comprising:
at an electronic device with one or more processors and memory:
obtaining a first set of data corresponding to one or more tokens predicted based on one or more previous tokens, wherein the one or more previous tokens are derived from a textual user input, a textual representation of a spoken user input, or a textual representation of a user gesture input;
determining a probability that the first set of data corresponds to a prediction generated by a first language model trained using a user privacy preserving training process, wherein the probability is relative to a second probability that the first set of data corresponds to a prediction generated by a second language model not trained using the user privacy preserving training process; and
in accordance with a determination that the probability is within a predetermined range:
determining that the one or more tokens correspond to a prediction associated with the first language model trained using the user privacy preserving training process; and
outputting a predicted token sequence including the one or more tokens and the one or more previous tokens.

32. The method of claim 31, wherein the first set of data includes a probability distribution for the one or more predicted tokens over a vocabulary associated with the first language model.

33. The method of claim 31, further comprising:
generating, using the first language model, the first set of data based on the one or more previous tokens.

34. The method of claim 31, wherein the user privacy preserving training process includes a private federated learning process.

35. The method of claim 31, wherein the predicted token sequence represents an emerging vocabulary.

36. The method of claim 31, further comprising:
in accordance with a determination that the probability is not within the predetermined range and is within a second predetermined range, determining that the one or more tokens do not correspond to a prediction associated with the user privacy preserving training process.

37. The method of claim 31, wherein the one or more predicted tokens include any of one or more characters or one or more words.

38. The method of claim 31, wherein the one or more previous tokens include any of one or more characters or one or more words.

39. The method of claim 31, wherein determining the probability that the first set of data corresponds to a prediction generated by the first language model trained using the user privacy preserving training process includes determining a probability that the prediction is attributable to the user privacy preserving training process.

40. The method of claim 31, wherein determining the probability includes:
   inputting the first set of data into a discriminator to obtain the probability.

41. The method of claim 40, the one or more programs further comprising instructions, which when executed by one or more processors of an electronic device, cause the electronic device to:
   generate, using the first language model, first data corresponding to a first plurality of predicted tokens;
   generate, using a third language model, second data corresponding to a second plurality of predicted tokens, wherein:
      the third language model is not trained using the user privacy preserving training process; and
      the first data and the second data are generated based on a same plurality of previous tokens; and
   train the discriminator using the first data and the second data.

42. The method of claim 31, further comprising:
   further in accordance with the determination that the probability is within the predetermined range, modifying the first language model.

43. The method of claim 42, wherein modifying the first language model includes:
   in accordance with a determination that the predicted token sequence corresponds to a first type of prediction, modifying the first language model to prevent prediction of the predicted token sequence; and
   in accordance with a determination that the predicted token sequence corresponds to a second type of prediction, training the first language model using training data to reduce a prediction frequency of the predicted token sequence, the training data being selected based on the predicted token sequence to reduce a frequency of predictions of the second type.

44. The method of claim 43, wherein the first type of prediction includes a prediction determined to be objectionable.

45. The method of claim 43, wherein the second type of prediction includes a prediction representing systemic bias in the first language model.

* * * * *